US009245257B2

(12) United States Patent
McConnell

(10) Patent No.: US 9,245,257 B2
(45) Date of Patent: Jan. 26, 2016

(54) SYSTEM AND METHOD FOR GENERATING A USER PROFILE BASED ON SKILL INFORMATION

(71) Applicant: salesforce.com, inc., San Francisco, CA (US)

(72) Inventor: Jager McConnell, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 117 days.

(21) Appl. No.: 13/873,528

(22) Filed: Apr. 30, 2013

(65) Prior Publication Data

US 2014/0282098 A1 Sep. 18, 2014

Related U.S. Application Data

(60) Provisional application No. 61/777,310, filed on Mar. 12, 2013.

(51) Int. Cl.
*G06F 3/00* (2006.01)
*G06Q 10/10* (2012.01)
*G06Q 10/06* (2012.01)
*H04L 29/06* (2006.01)

(52) U.S. Cl.
CPC .......... *G06Q 10/105* (2013.01); *G06Q 10/0639* (2013.01); *H04L 65/403* (2013.01)

(58) Field of Classification Search
CPC .................................................. H04L 65/403
USPC ........................................................ 715/753
See application file for complete search history.

(56) References Cited

U.S. PATENT DOCUMENTS

| 5,577,188 | A | 11/1996 | Zhu |
| 5,608,872 | A | 3/1997 | Schwartz |
| 5,649,104 | A | 7/1997 | Carleton |
| 5,715,450 | A | 2/1998 | Ambrose et al. |
| 5,761,419 | A | 6/1998 | Schwartz |
| 5,819,038 | A | 10/1998 | Carleton |
| 5,821,937 | A | 10/1998 | Tonelli et al. |
| 5,831,610 | A | 11/1998 | Tonelli et al. |

(Continued)

OTHER PUBLICATIONS

Saba, "Saba Announces Revolutionary Social Enterprise Platform," Press Release, Mar. 20, 2012, pp. 1-4, Redwood Shores, California.

*Primary Examiner* — William Titcomb
(74) *Attorney, Agent, or Firm* — Dergosits & Noah LLP; Todd A. Noah

(57) ABSTRACT

Disclosed are systems, apparatus, and methods for generating a user profile interface based on skill information associated with a user. Skill information associated with the user may be received. The skill information may include data values that identify at least one skill associated with the user, and that further identify a skill level associated with the at least one skill. A plurality of user interface components may be generated based on the received skill information. The plurality of user interface components may be configured to display a graphical representation generated based on at least some of the skill information. An input may be received. The input may identify a configuration of the plurality of user interface components and may further identify a representation of the skill information within the plurality of user interface components. The plurality of user interface components may be rendered and displayed on a display device.

20 Claims, 29 Drawing Sheets

(56) References Cited

U.S. PATENT DOCUMENTS

| | | |
|---|---|---|
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff et al. |
| 6,216,135 B1 | 4/2001 | Brodersen et al. |
| 6,233,617 B1 | 5/2001 | Rothwein et al. |
| 6,236,978 B1 | 5/2001 | Tuzhilin et al. |
| 6,266,669 B1 | 7/2001 | Brodersen et al. |
| 6,288,717 B1 | 9/2001 | Dunkle et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,100,111 B2 | 8/2006 | McElfresh et al. |
| 7,269,590 B2 | 9/2007 | Hull et al. |
| 7,340,411 B2 | 3/2008 | Cook |
| 7,373,599 B2 | 5/2008 | McElfresh et al. |
| 7,406,501 B2 | 7/2008 | Szeto et al. |
| 7,454,509 B2 | 11/2008 | Boulter et al. |
| 7,599,935 B2 | 10/2009 | La Rotonda et al. |
| 7,603,331 B2 | 10/2009 | Tuzhilin et al. |
| 7,620,655 B2 | 11/2009 | Larsson |
| 7,644,122 B2 | 1/2010 | Weyer et al. |
| 7,668,861 B2 | 2/2010 | Steven |
| 7,698,160 B2 | 4/2010 | Beaven et al. |
| 7,747,648 B1 | 6/2010 | Kraft et al. |
| 7,827,208 B2 | 11/2010 | Bosworth et al. |
| 7,945,653 B2 | 5/2011 | Zuckerberg et al. |
| 8,005,896 B2 | 8/2011 | Cheah et al. |
| 8,010,663 B2 | 8/2011 | Firminger et al. |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,103,611 B2 | 1/2012 | Tuzhilin et al. |
| 8,150,913 B2 | 4/2012 | Cheah et al. |
| 8,275,836 B2 | 9/2012 | Beaven et al. |
| 8,473,512 B2 * | 6/2013 | Petersen ............ G06F 17/30867 707/776 |
| 9,110,929 B2 * | 8/2015 | Garcia ................ H04L 65/4084 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0086366 A1 | 4/2008 | Concordia et al. |
| 2011/0184958 A1 | 7/2011 | Krishnamoorthy et al. |
| 2012/0109837 A1 * | 5/2012 | Sahagun et al. ............. 705/321 |
| 2012/0197733 A1 | 8/2012 | Skomoroch et al. |
| 2013/0046704 A1 | 2/2013 | Patwa et al. |
| 2013/0185218 A1 * | 7/2013 | Hermsdorff et al. .......... 705/321 |
| 2013/0191299 A1 * | 7/2013 | Hermsdorff et al. .......... 705/321 |
| 2013/0304829 A1 * | 11/2013 | Olsen et al. ................... 709/206 |
| 2014/0245184 A1 * | 8/2014 | Cheng et al. .................. 715/753 |

* cited by examiner

SYSTEM AND METHOD FOR GENERATING A USER PROFILE BASED ON SKILL INFORMATION

CLAIM OF PRIORITY

This application claims the benefit of U.S. Provisional Patent Application 61/777,310 entitled SOCIAL EMPLOYEE PROFILE, by Jager McConnell, filed Mar. 12, 2013, the entire contents of which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to computer systems and software, and, more particularly, to online social networking, messaging, and profile systems.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Organizations and enterprises typically employ many different types of software and computing technologies to meet their computing needs. However, installing and maintaining software on an organization's own computer systems may involve one or more drawbacks. For example, when software must be installed on computer systems within the organization, the installation process often requires significant time commitments, since organization personnel may need to separately access each computer. Once installed, the maintenance of such software typically requires significant additional resources. Each installation of the software may need to be separately monitored, upgraded, and/or maintained. Further, organization personnel may need to protect each installed piece of software against viruses and other malevolent code. Given the difficulties in updating and maintaining software installed on many different computer systems, it is common for software to become outdated. Also, the organization will likely need to ensure that the various software programs installed on each computer system are compatible. Compatibility problems are compounded by frequent upgrading, which may result in different versions of the same software being used at different computer systems in the same organization.

Accordingly, organizations and enterprises increasingly prefer to use on-demand services accessible via the Internet rather than software installed on in-house computer systems. On-demand services, often termed "cloud computing" services, take advantage of increased network speeds and decreased network latency to provide shared resources, software, and information to computers and other devices upon request. Cloud computing typically involves over-the-Internet provision of dynamically scalable and often virtualized resources. Technological details can be abstracted from the users, who no longer have need for expertise in, or control over, the technology infrastructure "in the cloud" that supports them.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

Figure 1:
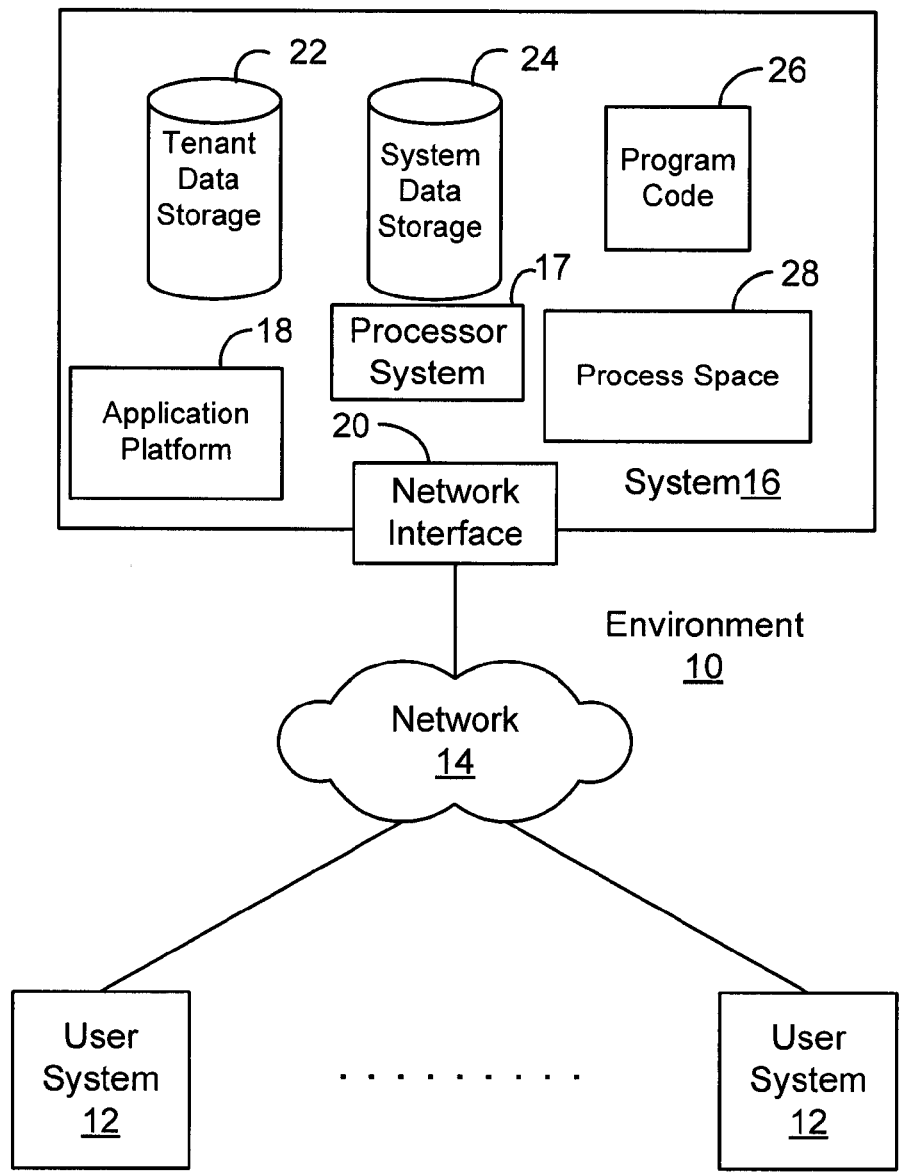
FIG. 1 shows a block diagram of an example of an environment 10 in which an on-demand database service can be used in accordance with some implementations.

Systems and methods are provided for generating and managing social employee profiles. Examples of systems, apparatus, and methods according to the disclosed implementations are described in this section. These examples are being provided solely to add context and aid in the understanding of the disclosed implementations. It will thus be apparent to one skilled in the art that implementations may be practiced without some or all of these specific details. In other instances, certain process/method operations, also referred to herein as "blocks" or "steps," have not been described in detail in order to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the blocks of methods shown and described herein are not necessarily performed in the order indicated. It should also be understood that the methods may include more or fewer blocks than are indicated. In some implementations, blocks described herein as separate blocks may be combined. Conversely, what may be described herein as a single block may be implemented in multiple blocks.

Various implementations described or referenced herein are directed to different methods, apparatus, systems, and computer program products for a profile management system that may interact with or include an online social network, also referred to herein as a social networking system or an enterprise social network. In some implementations, the disclosed methods, apparatus, systems, and computer program products may be configured or designed for use in a multi-tenant database environment.

In some implementations, an online social network may allow a user to follow data objects in the form of records such as cases, accounts, or opportunities, in addition to following individual users and groups of users. One example of such an online social network is Chatter®, provided by Salesforce.com® of San Francisco, Calif. Such online social networks can be implemented in various settings, including enterprises such as business organizations or groups within such an organization. For instance, Chatter® can be used by employee users of a business organization to communicate and collaborate with each other for various purposes.

The "following" of a record stored in a database allows a user to track the progress of that record. Updates to the record, also referred to herein as changes to the record, can occur and be noted on an information feed such as the record feed or the news feed of a user subscribed to the record. With the disclosed implementations, such record updates are often presented as an item or entry in the feed. Such a feed item can include a single update or a collection of individual updates. Information updates presented as feed items in an information feed can include updates to a record, as well as other types of updates such as user actions and events, as described herein.

Online social networks are increasingly becoming a common way to facilitate communication between individuals and groups of individuals, any of whom can be recognized as "users" of a social networking system. In many social networks, individuals may establish connections with one other, which may be referred to as "friending" one another. By establishing such a connection, one user may be able to see information generated by or associated with another user. For instance, a first user may be able to see information posted by a second user to the first user's personal social network page. One implementation of such a personal social network page is a user's profile page, for example, in the form of a web page representing the user's profile. For example, a post submitted by the second user about the first user can be presented on the first user's profile feed, also referred to herein as the user's "wall," which can be displayed on the first user's profile page.

In some implementations, an information feed in the context of a social network may be a collection of information selected from the social network for presentation in a user interface. The information presented in the information feed may include posts to a user's wall or any other type of information accessible within the social network. A feed item can include various types of data including character-based data, audio data, video data, or combinations of these. For instance, a post can include text in combination with a JPEG image or animated image.

Feed items in information feeds such as a user's news feed may include messages, which can take the form of: posts comprising textual/character-based inputs such as words, phrases, statements, questions, emotional expressions, symbols, leetspeak, or combinations of these; responses to posts, also referred to herein as "comments", such as words, phrases, statements, answers, questions, reactionary emotional expressions, or combinations of these; indications of personal preferences which can be submitted as responses to posts or comments; status updates; and hyperlinks. In other examples, messages can be in the form of file uploads, such as presentations, documents, multimedia files, and the like.

These and other implementations described and reference herein may be embodied in various types of hardware, software, firmware, of combinations of these. For example, some techniques disclosed herein may be implemented, at least in part, by machine-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of machine-readable media include, but are not limited to, magnetic media such as hard disks, floppy disks, and magnetic tape; optical media such as CD-ROM disks; magneto-optical media; and hardware devices that are specially configured to store program instructions, such as read-only memory devices ("ROM") and random access memory ("RAM") devices. These and other features of the disclosed implementations will be described in more detail below with reference to the associated drawings.

The term "multi-tenant database system" can refer to those systems in which various elements of hardware and software of a database system may be shared by one or more customers. For example, a given application server may simultaneously process requests for a great number of customers, and a given database table may store rows for a potentially much greater number of customers. The term "query plan" generally refers to one or more operations used to access information in a database system.

A "user profile" or "user's profile" is generally configured to store and maintain data about the user of the database system which may be a part of or a component of a profile management system. The data can include general information, such as title, phone number, a photo, a biographical summary, and a status (e.g., text describing what the user is currently doing). As mentioned below, the data can include messages created by other users. Where there are multiple tenants, a user is typically associated with a particular tenant. For example, a user could be a salesperson of a company, which is a tenant of the database system that provides a database service.

The term "record" generally refers to a data entity, such as an instance of a data object created by a user of the database service, for example, about a particular (actual or potential) business relationship or project. The data object can have a data structure defined by the database service (a standard object) or defined by a subscriber (custom object). For example, a record can be for a business partner or potential business partner (e.g., a client, vendor, distributor, etc.) of the user, and can include an entire company, subsidiaries, or contacts at the company. As another example, a record can be a project that the user is working on, such as an opportunity (e.g., a possible sale) with an existing partner, or a project that the user is trying to get. In one implementation of a multi-tenant database, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "information feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) refers to an item of information, which can be presented in the feed such as a post published by a user. Feed items of information about a user can be presented in a user's profile feed of the database, while feed items of information about a record can be presented in a record feed in the database, by way of example. A profile feed and a record feed are examples of different information feeds. A second user following a first user or record can receive the feed items associated with the first user and the record for display in the second user's news feed, which is another type of information feed. In some implementations, the feed items from any number of followed users and records can be combined into a single information feed of a particular user.

As examples, a feed item can be a message, such as a user-generated post of text data, and a feed tracked update to a record or profile, such as a change to a field of the record. A feed can be a combination of messages and feed tracked updates. Messages include text created by a user, and may include other data as well. Examples of messages include posts, user status updates, and comments. Messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a graphical user interface (GUI), for instance, on the user's profile page, as part of the user's profile feed. In contrast to a post, a user status update changes a status of a user and can be made by that user or an administrator. Other similar sections of a user's profile can also include an "About" section. A record can also have a status, the update of which can be provided by an owner of the record or other users having suitable write access permissions to the record. The owner can be a single user, multiple users, or a group. In one implementation, there is only one status for a record.

In one implementation, a comment can be made on any feed item. In another implementation, comments are organized as a list explicitly tied to a particular feed tracked update, post, or status update. In this implementation, comments may not be listed in the first layer (in a hierarchal sense)

of feed items, but listed as a second layer branching from a particular first layer feed item.

In various implementations, systems, apparatus, and methods are provided for generating and managing user profiles, which may be social employee profiles. A profile management system may aggregate information about an entity which may be a user or employee associated with an organization. The information may include various data objects and records which may be used to identify one or more skills that the user possesses. In various implementations, a skill may be defined by one or more data values identifying a professional ability or competency that the user possesses. For example, a skill may be a professional ability such as coding, team building, public speaking, JavaScript coding, content strategy, web design, sales, marketing, innovating, and advertising. The retrieved and aggregated information may also be used to assess a skill level for each identified skill. In this way, a profile management system may generate a user profile for a user that includes information that has been aggregated from various different resources, such as online social networks, blogs, forums, and publications. The user profile may also provide the user with automatic and objective identification and verification of the user's skills and skill levels. Further still, the user profile management system may provide the user with the ability to search for jobs based on the retrieved and generated skill information, as well as be searched for by potential employers.

FIG. 1 shows a block diagram of an example of an environment 10 in which an on-demand database service can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

Environment 10 is an environment in which an on-demand database service exists. User system 12 may be any machine or system that is used by a user to access a database system 16. For example, any of user systems 12 can be a handheld computing device, a mobile phone, a laptop computer, a work station, and/or a network of such computing devices. As illustrated in FIG. 1 user systems 12 might interact via a network 14 with an on-demand database service, which is implemented in the example of FIG. 1 as database system 16.

An on-demand database service, such as system 16, is a database system that is made available to outside users, who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the "Internet" with a capital "I." The Internet will be used in many of the examples herein. However, it should be understood that the networks that the present implementations might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 1, implements a web-based customer relationship management (CRM) system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIG. 1, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1 include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) of the computing device in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. A computer program product implementation includes a non-transitory machine-readable storage medium (media) having instructions stored thereon/in, which can be used to program a computer to perform any of the processes/methods of the implementations described herein. Computer program code 26 for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to a computing device or system, including processing hardware and process space(s), an associated storage system such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

Figure 2:
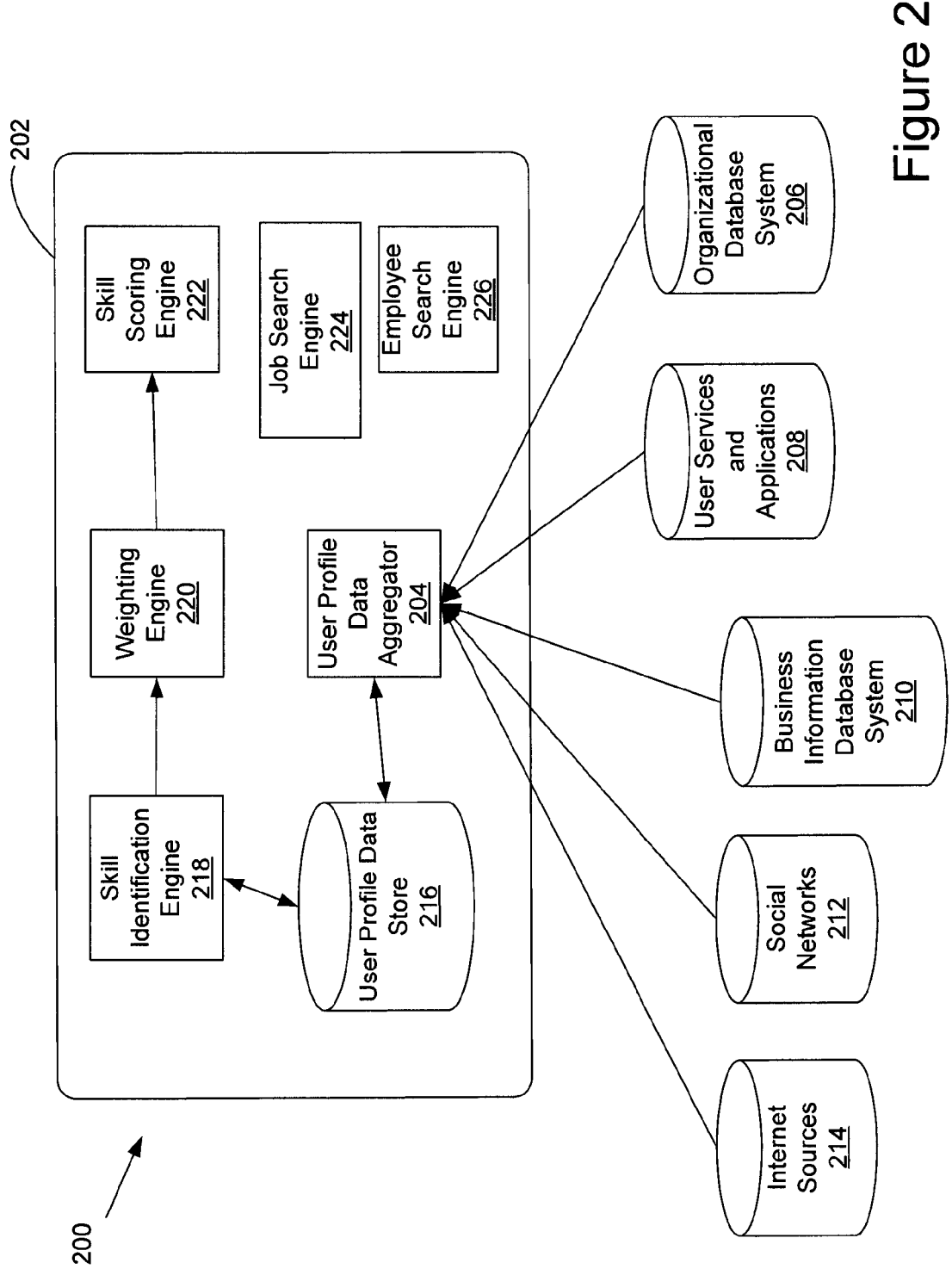
FIG. 2 illustrates a block diagram of an example of a system for generating and managing user profiles, implemented in accordance with some implementations.

FIG. 2 illustrates a block diagram of an example of a system for generating and managing user profiles, implemented in accordance with some implementations. System 200 may include various components which enable a user, who may be an employee of a company or organization, to retrieve different types of information from various different sources, networks, and storage locations, and store the information in a central location. Moreover, system 200 may analyze the retrieved information to identify and score professional skills that the user has that are relevant to the user's industry. Furthermore, system 200 may provide the user with the ability to manage the retrieved and generated skill information to create his or her own user profile which may be a customizable online social employee profile.

System 200 may include user profile management system 202. In some implementations, user profile management system 202 is a system component implemented in one or more servers and configured to aggregate information about an entity, such as an employee of a company or a corporation. User profile management system 202 may be further configured to store the aggregated information in a structured representation of one or more data objects, such as a user profile. Moreover, user profile management system 202 may analyze the aggregated data to identify and score skills that the user or employee possesses. The skills may be stored, maintained, and presented to the user as part of the user's profile in user profile management system 202. Furthermore, user profile management system 202 may use the aggregated and scored information to provide the user with recommendation and search functionalities.

User profile management system 202 may include user profile data aggregator 204, which may be a data aggregator implemented on at least one server and configured to aggregate data that forms the basis of the user's profile. User profile data aggregator 204 may be configured to aggregate data from multiple heterogeneous sources to create a central repository of data and information relevant to a user and the user's professional skills. The information and data may be retrieved from accounts managed by the user, such as the user's profile or account on a social network such as Twitter®. The information and data may be retrieved from data sources not managed by a user, such as public online forums, blogs, articles, and product reviews. Thus, user profile data aggregator 204 may aggregate various different types of data from various different sources to create a centralized and comprehensive repository of information that may be used to identify and evaluate the user's skills.

Accordingly, user profile data aggregator 204 may be configured to retrieve data from organizational database system 206. An organization, such as a company or a corporation, may store information about entities, such as its current and previous employees and business contacts, in its own private database system that may be protected by its own network and firewall. Thus, organizational database system 206 may be maintained separately from other information, such as information stored in cloud-based database systems and on-demand customer relationship management (CRM) systems. The company or organization may manage access and privacy settings for the data. The organization may modify one or more settings to make available to the public, or to current employees, data and information stored in organizational database system 206. If made available, internal information generated by the organization about employees may be retrieved and provided to user profile data aggregator 204.

User profile data aggregator 204 may also be configured to retrieve data from user services and applications 208, which may be services and applications that a user subscribes to from a service provider, such as Salesforce.com®. For example, a user may subscribe to a social networking service, such as Chatter®. In this example, profile information and other information may be stored in a database system operated and maintained by the service provider. The information may include basic biographical information as well as awards and achievements that may have been awarded to the user via a service or application that the user subscribes to. User profile data aggregator 204 may query information stored in the user's social networking service profile and retrieve information from the user's social networking service profile. Moreover, user profile data aggregator 204 may query and retrieve information from one or more information feeds that the user subscribes to or has posted feed items in. Thus, user profile data aggregator 204 may be configured to identify and retrieve relevant feed items from a database maintained by a service provider separate from user profile management system 202. User profile data aggregator 204 may also be configured to retrieve general information, such as metadata identifying how many posts the user has made in period of time, and how many people followed those posts.

User profile data aggregator 204 may also be configured to retrieve data from business information database systems 210, which may be online database resources that aggregate contact information as a service provided to subscribers. Thus, information may be maintained about various employees from various organizations as part of a centralized database, such as Dun & Bradstreet®. User profile data aggregator 204 may be configured to query a business database system based on an identifier associated with the user. For example, the employee's name or employee identification number may be used as the basis of a query run on business information database systems 210. Records or data objects included in business information database systems 210 that include data values matching the employee's name or employee identification number may be returned to user profile data aggregator 204 as a result of the query.

User profile data aggregator 204 may be further configured to retrieve data from social networks 212, which may provide information about a user from various social media outlets. More specifically, information identifying skills that a user has and information assessing a validity or skill level of each skill may be retrieved from various different social networks. The social networks may be networks directed at professional or occupational interactions, such as LinkedIn®. Social networks may also be broader networks generally directed towards personal and social interactions, such as Twitter® and Facebook®.

In some implementations, user profile data aggregator 204 is configured to retrieve data from a user's account in a social network. The user may have previously provided user profile data aggregator 204 with his or her social network account login information. User profile data aggregator 204 may be configured to use the previously provided login information to access the user's social network account and retrieve information about the user from the account. The user may have provided the login information to user profile data aggregator 204 when initially setting up an account with a service provider that provides user profile management system 202. For example, a user may have previously provided the service provider with his or her login information for the user's LinkedIn® account. User profile data aggregator 204 may use the login information to access the user's account and retrieve the user's social network profile information. The social network profile information may include the user's previous employers, identified skills, areas of expertise, achievement badges in particular skill areas, professional associations, and professional organizations. Moreover, information such as endorsements may be retrieved as well. For example, if a user has listed a skill of "product management" in his or her social network profile, one or more data values identifying the area of expertise "product management" may be retrieved by user profile data aggregator 204. If the user has received endorsements for this skill from five other users, information identifying the endorsements may be retrieved as well. In some implementations, the publicly available profile information for the five other users may be retrieved and used to assess a strength of each endorsement. For example, the occupational title of the endorsers may be retrieved and subsequently used to determine an overall strength of the endorsements for each skill, as discussed in greater detail below.

In addition to information included in a user's social network profile or account, user profile data aggregator 204 may retrieve information from social interactions within the social network. Thus, user profile data aggregator 204 may be configured to crawl and search publicly available discussion boards and feeds for information relevant to the user. Identifiers, such as hashtags, mentions, and other metadata tags, may identify or signal relevant information. For example, if a post or conversation thread mentions a user, the thread or post may be retrieved as relevant information. It will be appreciated that combinations of metadata tags may be used to identify and retrieve relevant information. The combinations of metadata tags may be generated by user profile data aggregator 204 based on one or more query strategies which may be predetermined. For example, if a user has identified skills such as coding and JavaScript® in the user's LinkedIn® profile, both "coding" and "JavaScript" may be used as the basis of a query used to retrieve relevant information. Any thread or post that mentions the user's name and either "coding" or "JavaScript" may be returned as part of the result of the query.

User profile data aggregator 204 may be configured to retrieve data from internet sources 214, such as blogs, e-commerce sites, publications, and online forums. User profile data aggregator 204 may be configured to periodically crawl internet sources 214 to identify and retrieve data related to a user, such as data that a user has posted, or data that has been posted about a user. As similarly discussed above, user profile data aggregator 204 may be configured to analyze identifiers, such as hashtags and mentions, as well as combinations of identifiers to identify and retrieve information relevant to the skills that the user possesses. In some implementations, user profile data aggregator 204 includes a predetermined list of internet sources that are periodically crawled. The list of internet sources may be modified and maintained by the service provider that provides user profile management system 202, or by the user for which skill information is being aggregated.

User profile management system 202 may also include user profile data store 216, which may include at least one storage volume configured to store data aggregated by user profile data aggregator 204. Accordingly, user profile data store 216 may provide a central repository in which all aggregated information for a user is stored. As set forth above, user profile management system 202 may provide profile management services for multiple users. Thus, user profile data store 216 may be a database system capable of storing profile data for all of the users using user profile management system 202.

User profile management system 202 may further include skill identification engine 218 which may be an application or process implemented on at least one server and configured to identify at least one skill for a particular user based on the information aggregated by user profile data aggregator 204 and stored in user profile data store 216. Skill identification engine 218 may be configured to compare data stored in user profile data store 216 with several identified or previously determined skills. The identified or previously determined skills may have been previously determined by a software developer or system administrator for user profile management system 202. Skill identification engine 218 may be configured to retrieve data from user profile data store 216 and process the data to correlate or map the retrieved information to at least one of the identified skills. It will be appreciated that a retrieved data value or piece of information may be mapped to more than one skill. In some implementations, skill identification engine 218 is configured to perform natural language processing operations or semantic analysis operations to correlate the retrieved information with the list of skills. Skill identification engine 218 may be configured to generate a first data object that includes a list of all identified skills for a user. Skill identification engine 218 may be further configured to generate additional data objects that store the aggregated skill information that was used to identify each of the identified skills. Accordingly, user profile data store 216 may store a list of skills that a user has. User profile data store 216 may also store a data object for each identified skill that includes the data used to identify the skill. Alternatively, the additional data objects may include pointers that point to the aggregated information stored in user profile data store 216.

In some implementations, user profile management system 202 includes weighting engine 220 which may be an application or process implemented on at least one server and configured to assign a weight, rank, or score to each piece of information or data for each identified skill. The weight generated by weighting engine 220 may be indicative of how relevant a piece of information is to a particular skill and how indicative a piece of information is to a particular skill level. Weighting engine 220 may analyze the contents of the skill information or analyze data associated with the skill information to determine a weight for each of the data values included in the data objects generated by skill identification engine 218. In this way, skill identification engine 218 may identify and organize information for each skill that a user possesses, and weighting engine 220 may assign a weight, score, or rank to each piece of information retrieved by user profile data aggregator 204 that has been associated with an identified skill.

User profile management system 202 may include skill scoring engine 222 which may be an application or process implemented on at least one server and configured to generate an overall score for each identified skill. Skill scoring engine 222 may generate a score based on weighted data for each identified skill. Thus, skill scoring engine 222 may be configured to perform one or more operations on the weighted data generated by weighting engine 220. The one or more operations may be calculating an average score for each identified skill. In some implementations, the average is a weighted average that is weighted based on the types of information underlying the weights. For example, a badge issued by a corporation may be weighted higher than a post in a forum or a blog. In some implementations, skill scoring engine 222 and weighting engine 220 are implemented as different parts of the same software application or component. Thus, the weighting and scoring of skill information may be performed as separate processing steps by separate system components in a distributed system. Alternatively, weighting and scoring may be performed as a single processing step by a single system component.

User profile management system 202 may also include job search engine 224 which may be an application or process implemented on at least one server and configured to provide search functionalities based on the generated skill scores. In some implementations, job search engine 224 may have access to a data store or a database system that provides a centralized repository for job listings. Job search engine 224 may be configured to query the job listing database and return job listings that are relevant to the user's identified skills. The query strategy used by job search engine 224 may be determined or configured based on the scores generated by skill scoring engine 222. Thus, relevant job listings may be identified and retrieved based on the skill scores generated by skill scoring engine 222.

In some implementations, job search engine 224 is configured to generate a skill recommendation that may be provided to a user via a user interface. The skill recommendation may be an identified skill that provides an un-scored identification of a skill that may be relevant to the user. The skill recommendation may also be a scored skill that identifies the skill and identifies the user's experience or expertise for that particular skill. Job search engine 224 may include a rendering engine capable of rendering the recommended skills as user interface components that may be displayed in a user interface screen to a user. In various implementations, a user interface component is an application or module of code that provides one or more graphical display functionalities for a user interface screen. As discussed in greater detail below, the user may be presented with the recommended skills and may update his or her profile information based on the presented information by adding one or more recommended skills to his or her profile information.

User profile management system 202 may additionally include employee search engine 226 which may be an application or process implemented on at least one server and configured to perform an employee search based on the generated skill scores. Employee search engine 226 may be configured to provide a user interface that may enable a user to search for other users or employees in the system. Thus, a user may be an employer or a person looking to hire an employee. Employee search engine 226 may provide the employer with a user interface through which the employer may select and prioritize skills that the employer desires in an employee. Employee search engine 226 may query information stored in user profile data store 216 to identify any users that have the desired skills and satisfy the employer's query. Thus, employee search engine 226 may be configured to identify one or more users based on the scored skills generated by skill scoring engine 222 and present the results to a user at a user interface.

Figure 3:
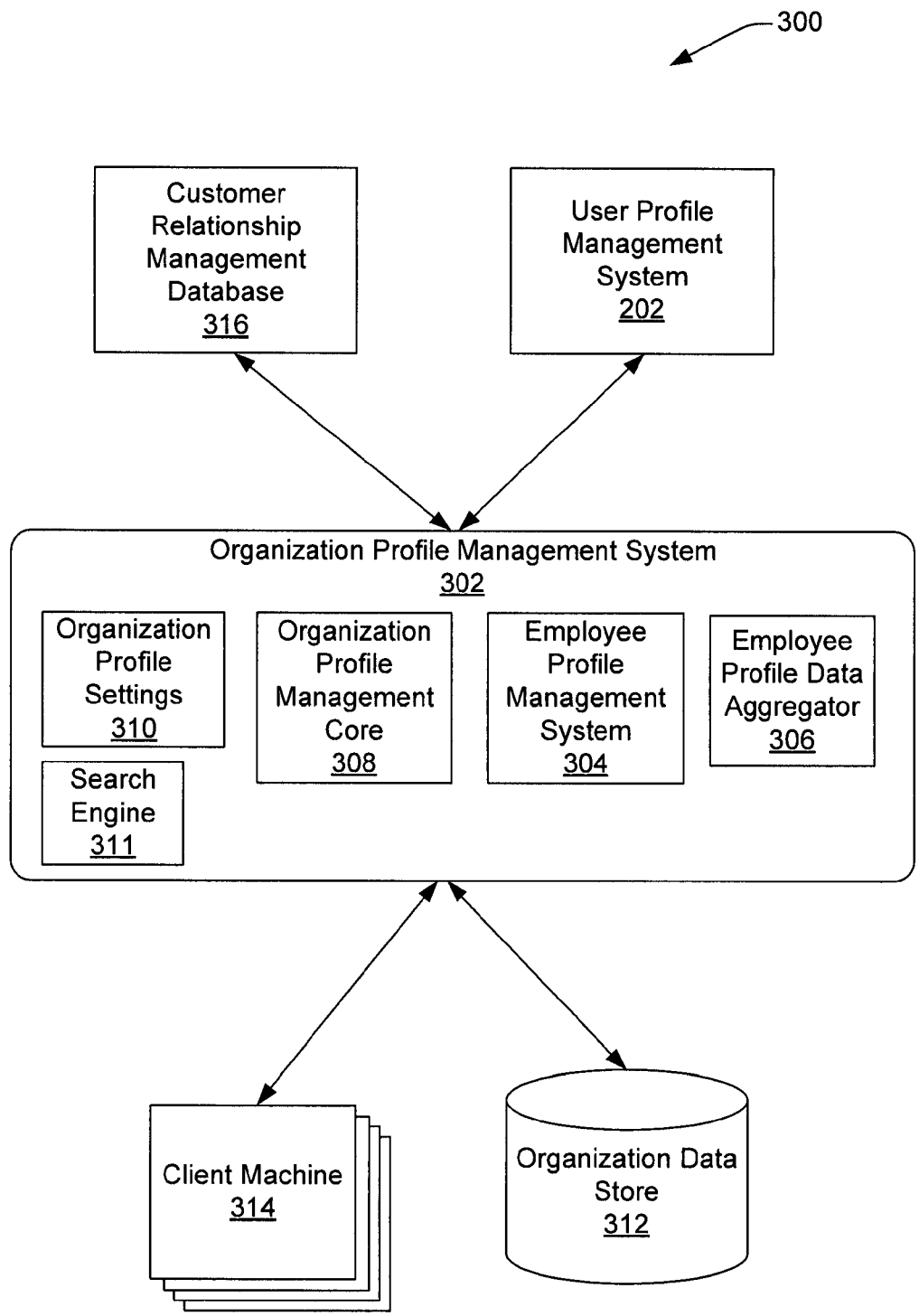
FIG. 3 illustrates a block diagram of an example of a system for generating and managing organization profiles, implemented in accordance with some implementations.

FIG. 3 illustrates a block diagram of an example of a system for generating and managing organization profiles, implemented in accordance with some implementations. System 300 may include various components which enable an organization, such as a company or corporation, to retrieve information about its employees from various different sources, networks, and storage locations, and store the information in a central location. Moreover, system 300 may analyze the retrieved information to identify and score professional skills that employees of the organization have. System 300 may also provide the organization with the ability to manage its own profile, generate aggregate statistics about its employees' skill information, and use the generated statistics to showcase professional skills and accomplishments that its employees have.

In some implementations, system 300 includes organization profile management system 302, which may be configured to manage an organization's profile and information about employees presented within the organization's profile. In some implementations, the organization's profile may be a public facing webpage or page in a social network, such as a Facebook® page. Organization profile management system 302 may include a rendering engine that renders the organization's profile as one or more pages that may include several user interface components capable of displaying various information about the organization and about employees that work for the organization. Thus, the organization may configure its profile to exemplify features and products offered by the organization, and notable employees that work for the organization.

Accordingly, organization profile management system 302 may include employee profile management system 304, which may be an application or process implemented in one or more servers and configured to manage profile information for employees of the organization. In some implementations, an organization may store and maintain internal information about employees. The internal information may be biographical information, contact information, and information identifying awards, achievements, and accomplishments earned by employees. As discussed in greater detail below, information may also be retrieved from sources external to the organization, such as user profile management system 202 which may be provided by a service provider such as Work.com. Employee profile management system 304 may be configured to combine information retrieved from internal and external sources to create a profile for each employee of the organization that includes both internal and external skill information associated with the employee. Employee profile management system 304 may also be configured to perform scoring and ranking of information, as similarly discussed above with reference to user profile management system 202.

The employee profiles and their associated data may be stored in a data store, such as organization data store 312, which may store any information aggregated and managed by organization profile management system 302. Organization data store 312 may include several storage volumes which may be part of a database system that provides a central repository for all information and data associated with the organization's profile and its employees' profiles.

Organization profile management system 302 may also include employee profile data aggregator 306, which may be a process or application configured to aggregate the information that is stored in the employee profiles. Employee profile data aggregator 306 may aggregate information from internal and external sources. For example, employee profile data aggregator 306 may be communicatively coupled via a network, such as the Internet, to external sources such as customer relationship management (CRM) database system 316 and user profile management system 202. Employee profile data aggregator 306 may be configured to query the external sources using an identifier, such an employee name or identification number. The external sources may query their data stores in response to receiving the query and return any relevant information as a result of the query. Employee profile data aggregator 306 may also be coupled via an internal network or a secure network to an internal source, such as client machine 314. Internal sources may provide information about employees that is generated by the organization, by organization members, or by interactions within the organization. Employee profile data aggregator 306 may retrieve information from the internal and external sources, and package the retrieved information in a single data object for each employee that has an employee profile.

Organization profile management system 302 may further include organization profile management core 308, which may be an application or engine configured to manage components of the organization's profile that are included a publicly facing version of the organization's profile. As set forth above, the publicly facing version of the organization's profile may be a page, collection or pages, or portal. The profile may include several components each capable of displaying a different type of information or providing a different functionality. For example, a first component may display information about recent awards the organization has won, while a second component displays notable and industry-recognized employees' profiles and provides links to their profile pages. Organization profile management core 308 may be configured to manage the content, appearance, and rendering of components included in the organization's profile. Moreover, organization profile management core 308 may be configured to manage which components are included the rendered profile, and which components are not included. Organization profile management core 308 may manage the organization's profile based on policies or settings which may be determined and/or modified by an organizational user, such as an organization administrator.

Organization profile management system 302 may include organization profile settings 310, which may include several configuration parameters that control or determine access to components of the organization's profile and information underlying the profile. Organization profile settings 310 may include several policies which may be applied to organization and employee information stored in organization data store 312. Thus, policies managed by organization profile settings 310 may determine whether or not an employee badge that was issued internally should be viewable publicly, or only viewable internally. The policies stored in organization profile settings may be managed and modified by an organizational administrator or other organizational entity.

Organization profile management system 302 may further include search engine 311, which may be configured to provide an organizational user with search functionalities of data stored in organization data store 312. As similarly discussed above with reference to user profile management system 202, generated skill information and skill scores may be used to formulate query strategies and identify and rank relevant employees for searches or queries issued by a user. Thus, search engine 311 may be configured to query employee profiles stored in organization data store 312 based on skill information generated by employee profile management system 304 and in response to an organizational user, such as a manager, issuing a query. As discussed in greater detail below, search engine 311 may be configured to provide the organizational user, such as the manager, with employee profiles relevant to the manager's initial query.

Figure 4:
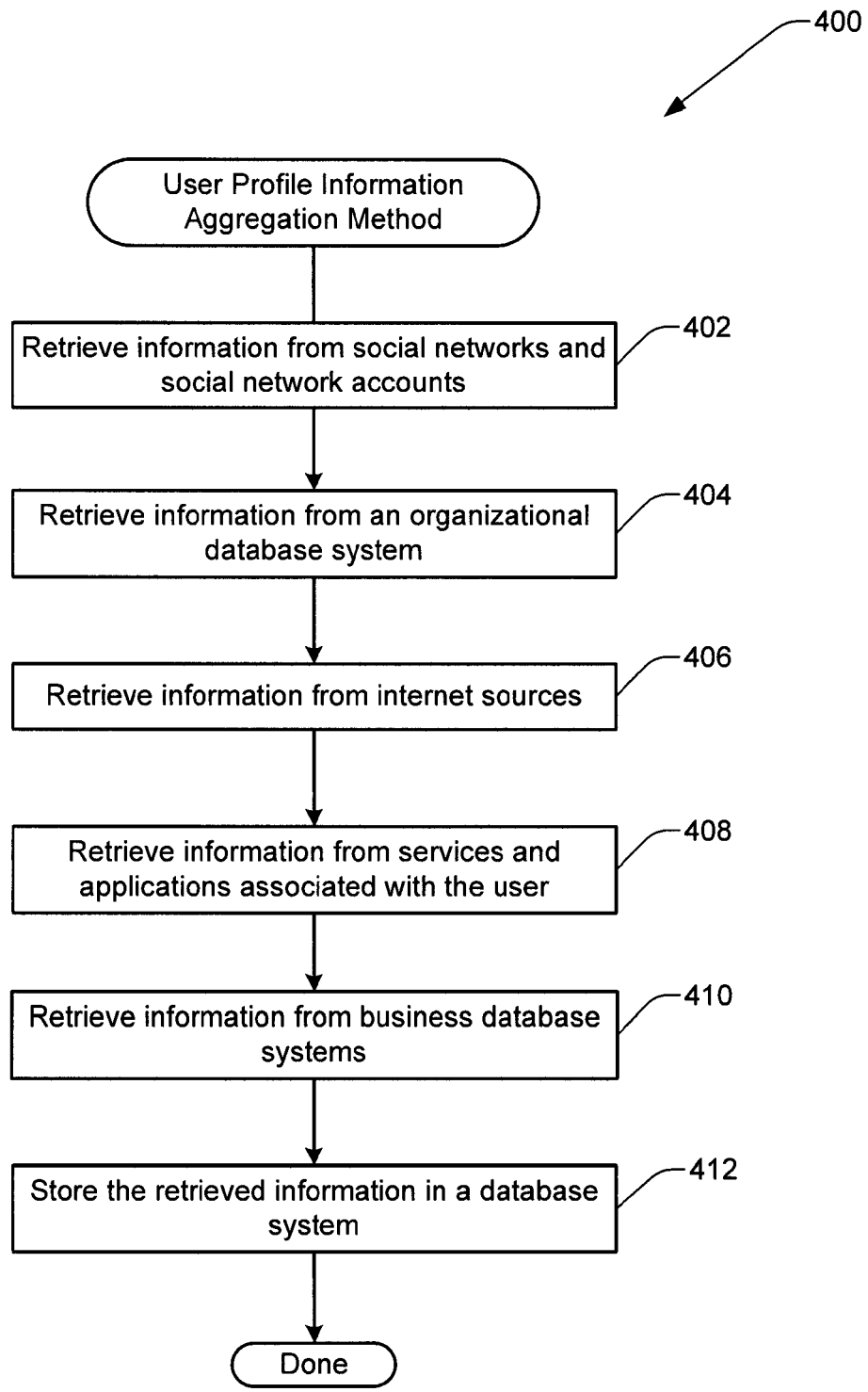
FIG. 4 illustrates a flowchart of an example of a method of aggregating skill information, performed in accordance with some implementations.

FIG. 4 illustrates a flowchart of an example of a method of aggregating skill information, performed in accordance with some implementations. Method 400 may analyze and query different information sources to identify and retrieve information relevant to identifying professional skills that a user or employee may possess. Method 400 may retrieve the relevant skill information from different networks and entities and store the skill information in a uniform format in a centralized repository. In this way, method 400 may provide a user with the ability to retrieve skill information from many disparate sources periodically and/or automatically, and further provide the user with the ability to access the retrieved skill information from a central and easily accessible location.

Accordingly, at step 402, information may be retrieved from social networks and social network accounts. As set forth above, a system component, such as an aggregator, may be configured to access and retrieve a user's skill information from social networks, such as Twitter® and LinkedIn®. The skill information may include one or more data values that include a user's self-identified skills, or skills identified or verified by other users or entities within the social network. Thus, the retrieved skill information may provide subjective and objective information about the user's skills.

Skill information may be retrieved by querying a storage location or a portion or section of a data object that is stored and maintained by the social network provider. For example, a social network provider, such as LinkedIn®, may store a user's social network profile in a data structure having different portions or data objects dedicated to storing different types of information or data. Information entered by a user which lists the user's skills or areas of expertise may be stored in a particular storage location of the data structure. The aggregator may be configured to identify that particular storage location, and retrieve the contents of the storage location. The contents may be parsed and analyzed to identify each skill or area of expertise that the user has listed. This process may be performed for multiple accounts in multiple social networks.

The skill information retrieved from the user's social network profile may be used as the basis of a query of posts and threads in the social network. If several skills are listed in the user's social network profile, those skills may be identified, retrieved, and used to generate a query strategy used to query posts and threads in the social network. Thus, information retrieved from the user's social network profile may be used in conjunction with other information about a user to identify and retrieve relevant posts and threads from the social network. For example, if a user lists a skill such as "marketing", threads and posts including mentions of the word "marketing" and the user's name may be identified and retrieved. Alternatively, a query strategy may be used that does not use previously identified information and returns anything that mentions or is authored by the user.

In addition to skills listed by the user, skills included in a predetermined list of skills may also be used as the basis of a query of posts and threads in a social network. Information included in the user's social network profile or any other accessible profile may be used to identify one or more skills from a predetermined list of skills, as discussed in greater detail below with reference to FIG. 5. Thus, a job title, such as "software developer" may be mapped to a skill such as "coding". The identified skill "coding" may then be used as the basis of a query of posts and threads within the social network.

Previously stored information may also be used as the basis of a query of posts and threads in a social network. In some implementations, skill information may be stored or cached from previous iterations of an aggregation or scoring method. The previously stored or cached information may be retrieved and used to query the social networks. Any identified skill information may be retrieved, stored, and used to update the stored or cached information.

In addition to threads and posts, metadata or related data associated with the user or the threads or posts may also be retrieved. For example, if a relevant post made by a user has been retrieved from a social network, a system component, such as an aggregator, may also retrieve one or more data values identifying how many people have liked the post, followed the post, shared the post, or performed some other action in response to viewing the post. In this way, contextual metadata may be retrieved in addition to the posts or threads in a social network.

Furthermore, general data about the user's social network activity may be retrieved. The general data may include aggregate statistics describing the user's activities within a particular social network. For example, the aggregate statistics may include a total number of posts made by the user, a total number of followers that follow the user, and a number of times the user has been mentioned within the social network. In some implementations, the aggregate statistics are generated and packaged by the social network, and subsequently retrieved by a user profile management system. Alternatively, the user profile management system may generate the aggregate statistics by searching and analyzing posts and threads within the social network.

At step 404, information may be retrieved from an organizational database system. In some implementations, an organization may store information about entities, such as its own employees. The organization may be identified based on profile information associated with the user, such as the user's current employer. Information stored in the organizational database system may be stored in a private network. However, the organization may make available to a service provider, such as Work.com, at least a portion of the information in the organizational database system. If made available, a system component, such as an aggregator, may query the organizational database and retrieve any information relevant to the user from the organizational database system. The information may include internal badges and achievement awards that have been awarded to the user by the organization. The organizational information may be retrieved from the organizational database and integrated into the user's skill information stored and maintained by the service provider.

At step 406, information may be retrieved from internet sources. As similarly discussed above, internet sources may refer to online resources such as blogs, forums, publications, journals, e-commerce sites, and product support sites. A system component, such as an aggregator, may search the internet sources for content that has been generated by or that relates to the user's skills. The user's username or other account or profile information may be used to identify relevant content. Information may be retrieved and stored in a central repository or database system.

For example, several blogs may be searched and analyzed to determine whether or not any posts or blog entries have been published which are relevant to the user and skills that the user may possess. In some implementations, a predetermined list of blogs may be used to determine which blogs are searched and analyzed. The predetermined list may be industry specific and may be identified based on profile information retrieved from the user's profile in the user profile management system. The predetermined list may be generated by a software developer or an administrator associated with a service provider that provides the user profile management system. A textual analysis may be performed for each blog, and any relevant document or blog entry, such as a blog entry authored by the user or that mentions the user, may be retrieved from the blog and stored in a central repository of the user profile management system. As similarly discussed above, contextual metadata associated with each relevant document or blog entry may be retrieved as well. For example, an aggregator may retrieve a number of comments made on a blog entry, a number of times the entry was shared via one or more social networks, and labels or tags associated with the blog.

In another example, forums may be searched and analyzed to determine whether or not any posts, conversation threads, or responses have been published which are relevant to the user and skills that the user may possess. As similarly discussed with reference to blogs, a list of forums may be used to identify forums to be searched and analyzed. The contents of the forums may be searched and relevant information may be retrieved. For example, if a post or thread was authored by the user, the contents of the post or thread may be retrieved. The aggregator may also retrieve contextual data, such as a number of posts or threads authored by the user, a number of participants in a thread, whether or not a response authored by the user has been selected as the best response, and how many other users have indicated that a response posted by the user is helpful.

In yet another example, online publications may be searched and analyzed to determine whether or not any articles have been published which are relevant to the user and skills that the user may possess. The aggregator may search online databases for publications that were authored by or mention the user. If found, the publications and their associated contextual data may be retrieved and stored. The contextual data may include information such as how many times the publication has been cited or referenced by other people or publications, and information identifying who has cited the publication.

In still another example, e-commerce sites may be searched and analyzed to determine whether or not any products, reviews, or support articles have been published which are relevant to the user and skills that the user may possess. As similarly discussed above, if identified, relevant content and its associated contextual data may be retrieved and stored for future analysis. For example, if the user has authored a post on a product support page, the contents of the post may be retrieved and stored. Moreover, a number of responses to the post, likes, shares, and re-posts may be retrieved as well.

At step 408, information may be retrieved from services and applications associated with the user. In some implementations, a user subscribes to services or applications provided by a service provider, such as Chatter® provided by Salesforce.com®. The user may store skill information as part of the user's profile with the services and applications. Moreover, mentions of the user and posts made by the user within the service or applications may be identified and retrieved. In some implementations, the user provides a user profile management system with authentication information associated with the services and applications that the user subscribes to. A system component, such as an aggregator, may log into and retrieve skill information from the user's profiles in any services or applications that the user subscribes to. Thus, as similarly discussed above with reference to FIG. 2, information may be retrieved from the user's social networking service profile as well as information feeds, feed items, and posts that the user has participated in, been mentioned in, or follows. The retrieved skill information may be stored in a database system that may be part of the user profile management system.

At step 410, information may be retrieved from business database systems. As set forth above, business database systems may store collections of specific types of information about business entities, such as contact information. For example, a business database system, such as Dun & Bradstreet®, may store contact information about employees and details of their work history. In some implementations, a system component, such as an aggregator, is configured to access the business database system and query records stored in the business database system for any information relevant to the user. As similarly discussed above, the user's name or an identifier associated with the user may be used as the basis of the query. Any records including a data value matching the user's name or identifier may be returned as a result of the query.

At step 412, the retrieved information may be stored in a database system, which may be a data store that provides a centralized storage location for all information retrieved by an aggregator. The database system may store aggregated information for each user in a separate data object or record that is specific to that user. In some implementations, the retrieved information is mapped to a uniform format prior to being stored in the database system. In this way, skill information or data retrieved from several different and heterogeneous sources may be aggregated and stored in a single storage location and stored in a record or data object that is specific to a user and the user's profile.

Figure 5:
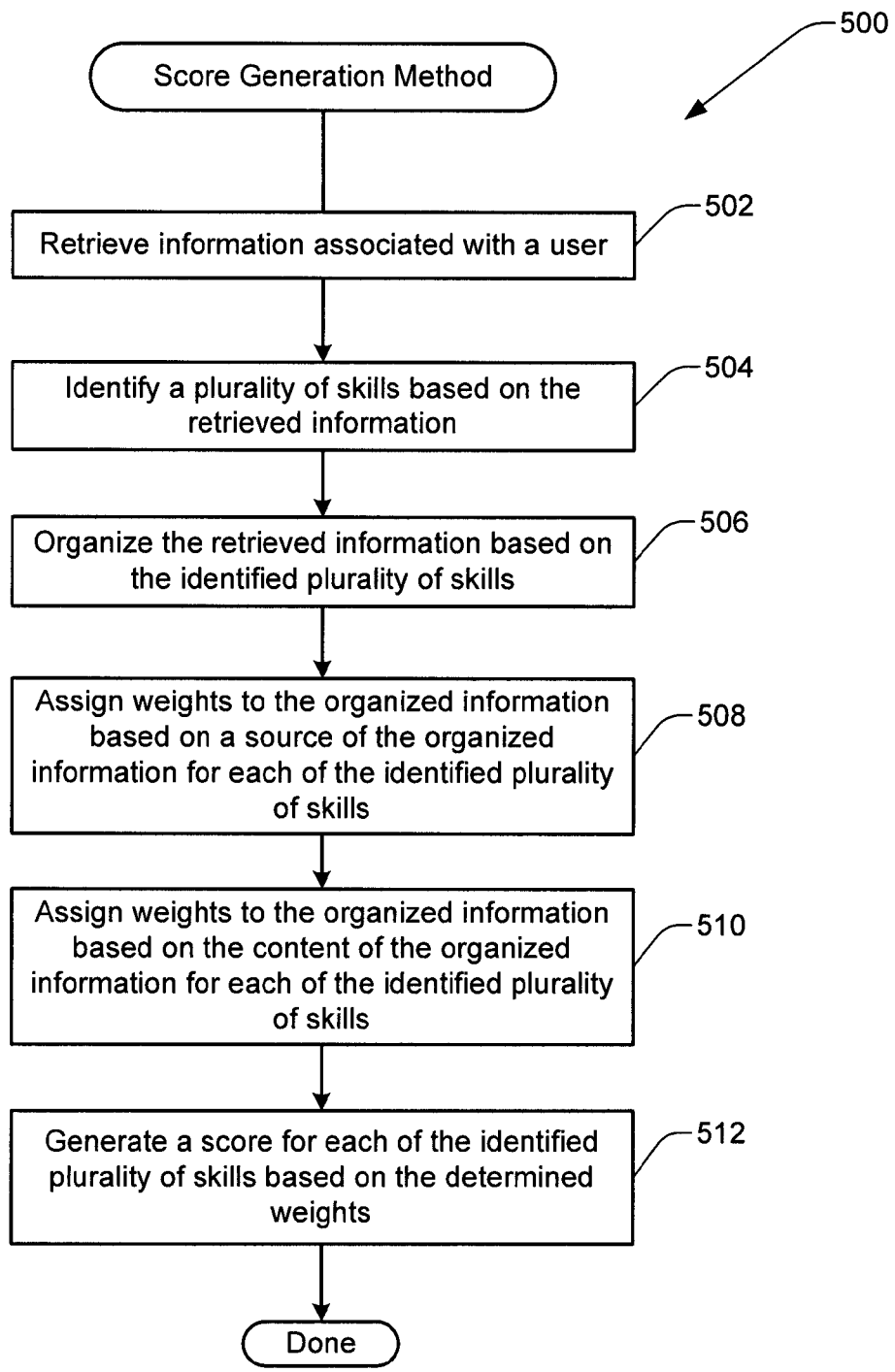
FIG. 5 illustrates a flowchart of an example of a method of generating scores based on aggregated skill information, performed in accordance with some implementations.

FIG. 5 illustrates a flowchart of an example of a method of generating scores based on aggregated skill information, performed in accordance with some implementations. Method 500 may analyze retrieved skill information to identify professional skills that a user possesses, and to assign a skill level to each skill that the user possesses. Identifying skills and assigning skill levels in this way provides the user with efficacious identification of professional skills that the user has, and further provides the user with objective verification of the user's skill level for each identified skill.

At step 502, information associated with a user may be retrieved. As set forth above with reference to FIG. 4, skill information and associated contextual data may be identified and retrieved from various different sources that may reside locally at an organization, or may be distributed throughout the internet. In some implementations, the information is aggregated and retrieved in response to a user input which may indicate that a user profile should be generated or updated. In various implementations, the information is aggregated periodically according to a predetermined schedule. Thus, the information may be aggregated and stored in a central data repository periodically, and retrieved from the repository upon the execution of method 500.

At step 504, a plurality of skills may be identified based on the retrieved information. In some implementations, skills are identified by comparing the contents of the aggregated information with at least one list of skills. The list of skills may have been previously generated by a software developer or a system administrator. A system component, such as a skill identification engine may map the aggregated information to skills in the list of skills based on a comparison between the aggregated information and the list of skills. The mapping may be performed based on a predetermined mapping scheme that may use a lexical resource to map retrieved data objects and records to skills based on the contents of the retrieved data objects and records. The mapping scheme may include a list of skills and a list of words associated with each skill. Accordingly, there may be a predetermined relationship between a list of words and a skill. If a retrieved data object or record includes any words that match words included in the list of words, the skill associated with the list of words may be identified as a skill that the user has. The contents of the data objects or records may be the body of a post, article, or other internet source, as well as various other portions or data fields which may store information such as titles, subjects, authorship information, category information, descriptive tags, contextual information, metadata, and any other information which may be associated with the data objects or records.

For example, a user may have authored an article about JavaScript® coding. The article may have been published on a website. The article may have been identified and retrieved by an aggregator based on authorship information associated with the article which identifies the user as the author. Because the article is about JavaScript, the article may mention JavaScript numerous times. According to a predetermined mapping scheme utilized by a skill identification engine, the word "JavaScript" may be included in a list of words associated with the skill coding. Because the word "JavaScript" mentioned in the article matches the word "JavaScript" included in the list of words associated with the skill "coding," the skill "coding" may be identified as a skill that the user possesses.

While the mapping scheme has been described as including a predetermined mapping scheme, the mapping scheme may be dynamically generated or modified as well. For example, contents of retrieved data objects and records may be added to lists of words associated with a skill. Returning to the previous example, if the article published by the user also mentions the words "source code" numerous times, the words "source code" may be added to the list of words associated with the skill "coding." This may occur automatically and dynamically without any input from a user or system administrator. In some implementations, a user, such as a system administrator, may initially configure or determine conditions or settings that identify when contents of retrieved information may be incorporated into the mapping scheme. For example, the user may specify that if a word is mentioned more than a threshold number of times, is mentioned in a particular location, such as a title of an article, or if a word has been flagged by an identifier such as a hashtag, the information may be incorporated in the mapping scheme by, for example, adding the word to a list of words associated with a particular skill.

Skills may also be identified based on a combination of several factors or the presence of other skills. For example, if a user has been identified as having the skills "management" and "team building," an additional or secondary mapping scheme may be used to identify an additional skill "team leader" based on the skills "management" and "team building." Thus, additional skills that a user possesses may be identified based on skills that were previously identified. All of the identified skills may be stored in a data object or record that is part of the user's profile.

At step 506, the retrieved information may be organized based on the identified plurality of skills. Each data object included in the retrieved information may have been mapped to an identified skill. The data objects may be grouped based on which skill they have been mapped to. For example, if aggregated information for a user includes Twitter® posts, blog entries, and a support article that have all been mapped to the skill of "management," the Twitter® posts, blog entries, and support article may be grouped into a single data object or structure. In this way, all information associated with a particular skill may be grouped into a data object specific to that particular skill. Accordingly, the aggregated information for the user may be grouped into several data objects, where each data object includes aggregated information for a particular skill possessed by the user.

At step 508, weights may be assigned to the organized information based on a source of the organized information for each of the identified plurality of skills. As set forth above, each identified skill has several pieces of information, such as data objects or data records, associated with it that were used to identify the skill. A system component, such as a weighting engine, may analyze each of the data objects to assign a weight or strength to each one. The strength or weight may be indicative of how much weight should be given a particular data object when determining the user's overall skill level for the identified skill. For example, several blog entries, forum posts, and product reviews may have been used to identify a skill of "web design" for a user. A weighting engine may analyze the source of each of the blog entries, forum posts, and product reviews to determine which of them should be given the most weight and the least weight when determining the user's skill level for the skill "web design."

In some implementations, the weighting or scoring may be performed based on a predetermined list of entities that may include several entities names or identifiers and a weight or strength score for each of the several entities. The list of entities may be ordered according to an importance or influence in a particular industry. The predetermined list of entities may be determined or provided by a user or system administrator as part of a configuration process for a user profile management system. If a source of a data object is listed in the list of entities, the data object may be assigned a weight or strength determined by the list of entities. The weighting or scoring may also be performed based on an analysis of characteristics of the source, such as an occupational title, a type of entity, or a type of source. As similarly discussed above, lists of characteristics may be used to assign a weight or score to data objects based on characteristics of their respective sources.

At step 510, weights may be assigned to the organized information based on the content of the organized information for each of the identified plurality of skills. Thus, in addition to weighting or scoring information based on a source of retrieved data objects, a system component, such as the weighting engine, may assign weights or scores based on content included in the data objects. The weighting engine may assign weights or scores based on content by comparing content included in the retrieved data objects with the predetermined list of skills, and determining how closely the content matches or fits the predetermined list of skills. For example, if the content includes text or words that match one or more skills exactly, the data object or record that includes the content may be weighted highly. If the content includes text or words that are similar to or related to a skill, then the data object or record that includes the content may be weighted moderately or lowly.

At step 512, a score may be generated for each of the identified plurality of skills. In various implementations, a system component, such as a skill scoring engine, may perform one or more operations on the weights generated at step 508 and step 510. For example, the skill scoring engine may average the weights for all data objects and records associated with each skill for a particular user. Thus, an average score may be generated based on an average of the weights that were calculated for a particular skill. In some implementations, the average may be a weighted average. The average may be weighted based on a predetermined factor, such as a type of data object or record, or a source of the data object or record. The generated scores for each skill may be stored in a user profile data store along with the user's profile.

Figure 6:
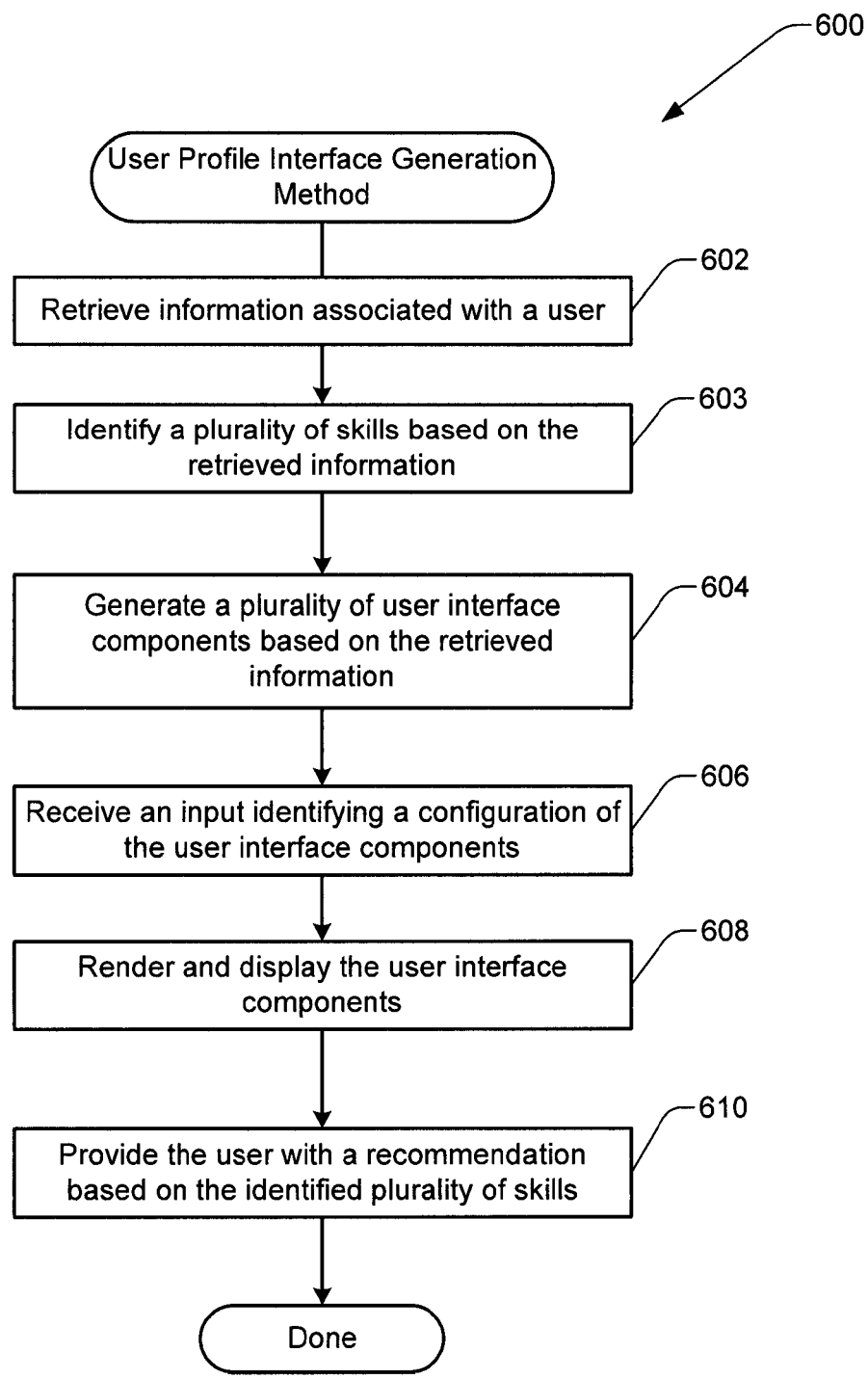
FIG. 6 illustrates a flowchart of an example of a method of generating a user interface for a user profile, performed in accordance with some implementations.

FIG. 6 illustrates a flowchart of an example of a method of generating a user interface for a user profile, performed in accordance with some implementations. Method 600 may generate and render various user interface components based on retrieved skill information and generated skill scores. Thus, method 600 may generate a user interface for a user's profile that displays professional skills that have been identified for the user, and further displays a skill level or score for each identified skill. The user interface may be presented via a web-browser over the Internet. Alternatively, the user interface may be integrated or incorporated with another service or social network and displayed as part of the user interface of the service or social network.

At step 602, information associated with a user may be retrieved. As similarly discussed above with reference to FIG. 4, skill information and associated contextual data may be identified and retrieved from various different sources that may reside locally at an organization, or may be distributed throughout the Internet. The information may be aggregated and stored in a central data repository, and retrieved from the repository upon the execution of method 600.

At step 603, a plurality of skills may be identified based on the retrieved information. As set forth above with reference to FIG. 5, skills that a user possesses may be identified and scored based on information retrieved by a component of a user profile management system. The identified skills may be stored in a data store of the user profile management system in a data object or data table associated with the user's profile.

At step 604, a plurality of user interface components may be generated based on the retrieved information. The user profile management system may include a rendering engine configured to generate and render user interface components based on the information stored in the user profile data store.

The rendering engine may generate user interface components that may be widgets that may be rendered as visual representations of the aggregated data and the scored data generated by the user profile management system, as discussed above with reference to FIG. 4 and FIG. 5. Thus, user interface components may be rendered as part of a user interface screen that displays representations of profile information associated with the user. The rendered user interface components may also display identified skills that a user possesses and scores associated with the skills. Examples of images of user interface screens that include rendered user interface components are discussed in greater detail below with reference to FIGS. 10-12.

At step 606, an input identifying a configuration of the user interface components may be received. In some implementations, the user profile management system may be configured to receive an input from a user that customizes or configures a presentation of user interface components in a user interface screen. Thus, a user may provide an input that identifies user interface components to be included in a subsequently rendered user interface screen, and that modifies a presentation of the identified user interface components. The input may also specify a location or social network in which the user interface component will be published or displayed. Moreover, the user may provide an input that configures or modifies information or data that is presented or represented by the user interface components. For example, if a user interface component is configured to display badges that an employee has earned, the employee may provide an input that selects which badges are displayed by the user interface component. Thus, an input provided by the user may determine which retrieved information is publicly accessible, and which retrieved information remains private. The input provided by the user may be stored as a setting associated with the user's profile or account. In this way, the user may manage accessibility or visibility of his or her skill information and user interface components generated based on the skill information. It will be appreciated that in some implementations, step 606 occurs prior to step 604, and step 604 occurs in response to or based on the input received at step 606. Examples of images of a user interface screens that may allow a user to manage user interface components are discussed in greater detail below with reference to FIGS. 13-16.

At step 608, the user interface components may be rendered and displayed. Thus, a rendering engine may render the identified and modified user interface components for display in a user interface screen. In some implementations, the user interface components are rendered and displayed as part of a webpage or a web-portal over a network such as the Internet. Thus, a user, such as an employee, may be provided with a web-portal through which the user may view his or her own profile page. Moreover, the user profile may have a publicly accessible and viewable web-page that other entities, such as recruiters or other employees, may view via the Internet.

In various implementations, the user interface components may be rendered and displayed via a service provided by an on-demand service provider, such as Chatter® provided by Salesforce.com®. For example, skill information and user interface components generated based on the skill information may be imported into a profile view provided by Chatter® and may be integrated with a user interface screen provided by Chatter®.

Moreover, user interface components may be imported and integrated into publicly facing or viewable profiles provided by other social networks. For example, a user's publicly viewable LinkedIn® profile may be modified to include rendered user interface components that include the user's identified skills, skill information, and scores associated with the user's identified skills. In this way, a service or social network may be augmented or supplemented with information that identifies and scores skills that a user, such as an employee of an organization, possesses. Examples of images of user interface screens that include rendered user interface components are discussed in greater detail below with reference to FIGS. 17-23.

At step 610, the user may be provided with a recommendation based on the identified plurality of skills. In some implementations, skills and skill levels may be identified at step 603 that the user is not aware that he or she possesses. For example, during the course of his employment, an employee may learn a programming language, such as Python, to generate and implement server-side programs for his company. He may also author blog entries detailing problems he has solved and he may have responded to many other programmers' questions in online forums and discussion boards. A user profile management system may retrieve the blog entries and posts, and identify and score skills based on the retrieved blog entries and posts. In this example, the employee may be identified as having a skill level of "expert" for the skill "server-side scripting language support." The user profile management system may generate a list or report of identified skills that may be presented to the employee at a user interface, which may be part of a webpage or web-portal, or part of a social network or service provided by a service provider, such as Chatter®. The list or report may be provided as a recommended list of skills that the employee may add to or include in his user profile. Therefore, while the employee may not realize that he is an expert at providing support for a server-side scripting language, the employee may be provided with a recommendation that identifies the skill and identifies the employee's skill level. The employee may also be provided with a user interface component that is configured to receive a selection from the employee that selects one or more recommended skills to be included in the employee's profile.

Figure 7:
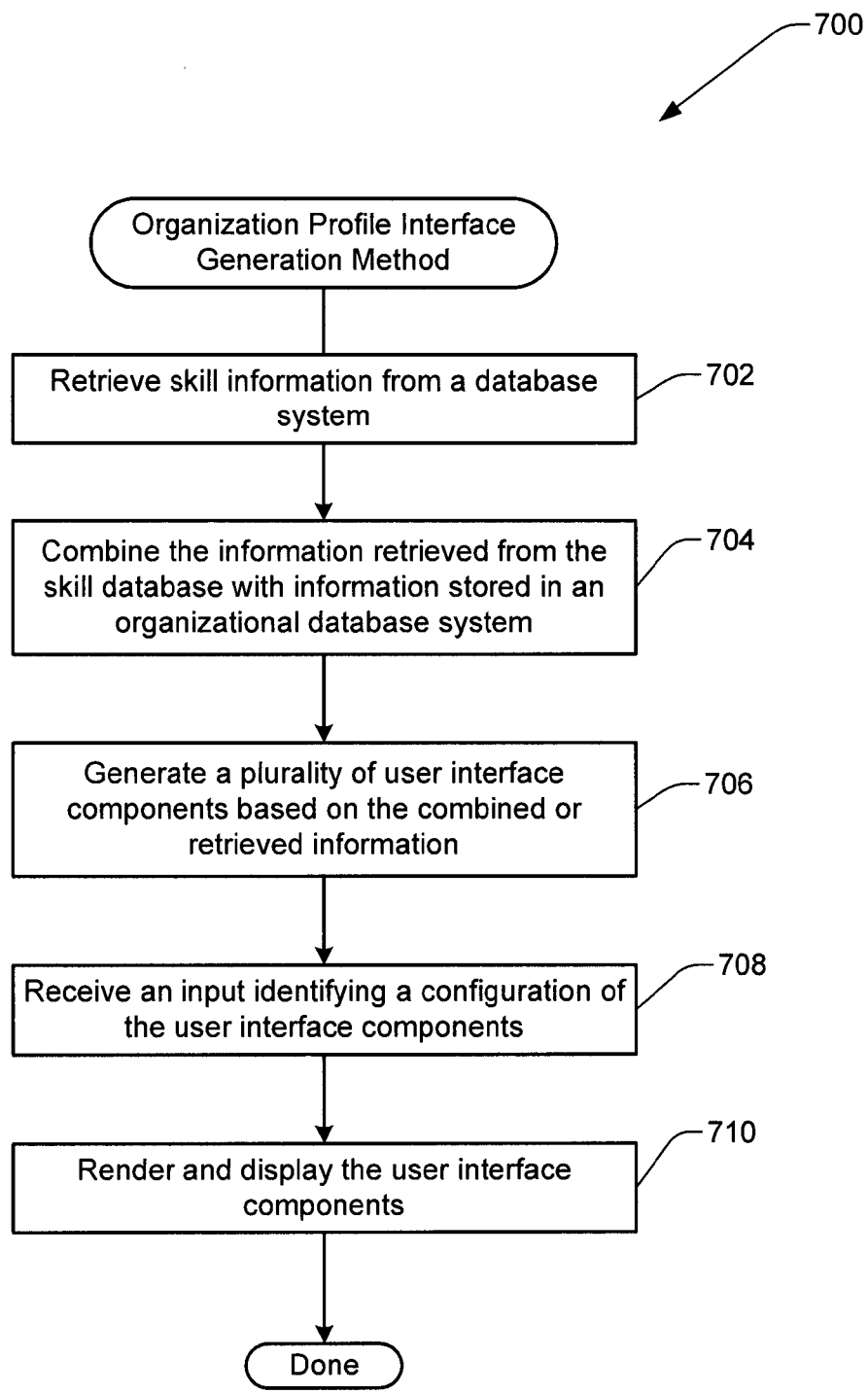
FIG. 7 illustrates a flowchart of an example of a method of generating a user interface for an organization profile, performed in accordance with some implementations.

FIG. 7 illustrates a flowchart of an example of a method of generating a user interface for an organization profile, performed in accordance with some implementations. Method 700 may generate and render various user interface components based on skill information associated with employees of the organization. Thus, method 700 may generate a user interface that may display professional skills that have been identified for employees within an organization. The user interface may also display aggregate skill statistics for employees within the organization, and highlight employee accomplishments and notable employees. Thus, method 700 provides an organization with the ability to manage the presentation of skill information associated with its employees.

At step 702, skill information may be retrieved from a database system. As previously discussed, a user profile management system may aggregate skill information about a user. The user profile management system may identify and score the user's skills based on the aggregated skill information. The aggregated information, identified skills, and generated scores may be stored in a database system, which may be referred to herein as a skill database. In some implementations, an organization, such as a company or corporation, may be provided with access to the skill database, which may be operated and maintained by a separate entity or service provider, such as Work.com®. The organization may query the skill database and retrieve skill information from the skill database that was aggregated and generated by the service provider. Accordingly, as similarly discussed with reference to FIG. 3, an organization profile management system may query the skill database and retrieve skill information for employees of the organization. The organization profile management system may formulate a query strategy based on the employee's name or an employee identifier.

In some implementations, the organization profile management system includes an instance of an employee profile management system which may be configured to identify skills and score skills associated with the organization's employees. Thus, instead of being provided with identified skills and scores, the organization profile management system may retrieve skill information and handle the identification and scoring of skills itself. Accordingly, as discussed in further detail below, an organizational entity, such as an organizational administrator, may manage and configure the skill identification and scoring process.

At step 704, the information retrieved from the skill database may be combined with the information stored in an organizational database. Thus, the organization may combine skill information and scores generated and provided by a service provider, such as Work.com®, with employee profile information that the organization stores and maintains separately. In this way, skill information retrieved from several sources, such as social networks, blogs, forums, and other companies, may be combined with internal information that the organization maintains separately and privately as part of its own network. For example, skills that have been identified and scored based on an employee's online activities as well as badges that the employee has earned at previous companies may be retrieved from the skill database and integrated with internal badges that the user has been awarded while working at the organization. In this way, the employee's profile in the organizational profile management system may include an aggregation of skill information from sources external and internal to the organization.

The retrieved information may also be integrated or combined with other information stored and maintained by the organization, such as organization profile information. As similarly discussed above with reference to FIG. 3, an organization may generate and maintain its own publicly accessible profile which may be displayed as a webpage or as part of a social network, such as a Facebook® page. In some implementations, the retrieved skill information may be combined and stored with the organization's profile. As discussed in greater detail below, the retrieved information may be used to generate and/or modify a presentation of the company's profile.

At step 706, a plurality of user interface components may be generated based on the combined or retrieved information. A system component, such as the organizational profile management system may include a rendering engine that may be configured to generate user interface components capable of representing skill information and scores associated with at least one employee. Thus, widgets or user interface components may be generated to create representations of skill information and scores associated with employees of the organization. In various implementations, the user interface components may be configured to present information about several employees, or several groups of employees. Thus, user interface components generated for the organization's profile may include aggregate skill information for different groups of employees. For example, a user interface component may be configured to represent profile information for all employees in the organization that have the skill "software developer" and a skill level of "expert."

At step 708, an input identifying a configuration of the user interface components may be received. According to various implementations, the contents, presentation, and information underlying the user interface components may be modified or configured based on input received by the organization profile management system. The input may be provided by an organizational entity, such as an organizational administrator, to configure or modify a presentation of the organization's profile. Thus, an administrator may select user interface components that will be rendered and presented in a user interface, and may also configure or modify the contents of the user interface components.

In various implementations, the input may include settings that identify information that may be published to a publicly accessible location, and further identify information that may remain private and inaccessible to the public. Accordingly, if a company uses internal awards, titles, and skills, the input may identify the information as internal, and the information may be removed from the information used to generate the user interface components. The settings defined by the input may be stored in a data store that maintains settings for the organization's profile. It will be appreciated that in some implementations, step 708 occurs prior to step 706, and step 706 occurs in response to or based on the input received at step 708.

At step 710, the user interface components may be rendered and displayed. A rendering engine may render the identified and modified user interface components for display in a user interface screen. In some implementations, the user interface components are rendered and displayed as part of a webpage or a web-portal over a network such as the Internet. Thus, the organization's profile may have a publicly accessible and viewable web-page that may be viewable via the Internet. In various implementations, the user interface components may be rendered and displayed via publicly facing or viewable profiles provided by other social networks. For example, an organization's publicly viewable Facebook® page may be modified to include rendered user interface components that showcase the organization's most prominent employees which may be identified as "experts," achievements made by employees in the organization, and skills possessed by employees within the organization. Thus, the organization's social network profile may be augmented or supplemented with information that identifies and exemplifies scores and skills that employees of the organization possess. An example of an image of a user interface screen that includes rendered user interface components is discussed in greater detail below with reference to FIG. 24.

Figure 8:
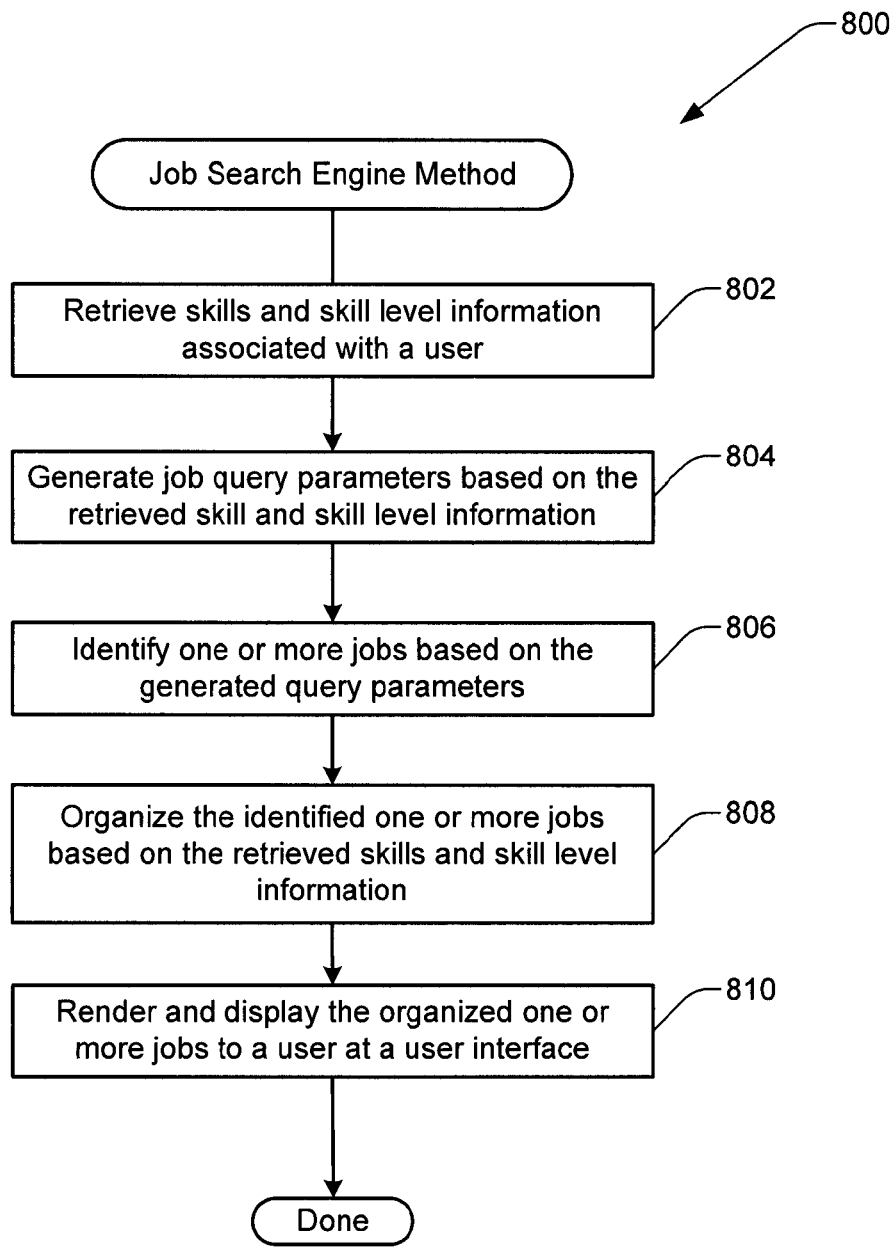
FIG. 8 illustrates a flowchart of an example of a method of identifying at least one job listing based on skill information, performed in accordance with some implementations.

FIG. 8 illustrates a flowchart of an example of a method of identifying at least one job listing based on skill information, performed in accordance with some implementations. Method 800 may provide a user with the ability use identified skills and skill scores to search for and identify potential jobs that the user may apply for. Method 800 may formulate query parameters based on skill information and skill scores associated with the user issuing the query. The query parameters may also be based on job listings that may be stored in a jobs database. In various implementations, a user profile management system or organizational profile management system may include a jobs database that stores job listings as data objects in a database system. The job listings may be created by software developers, system administrators, other users or employees, organizations, companies, and any other entity that may be provided access to the jobs database. If an entity has access to the jobs database, the entity may create a job listing and identify skills and skill levels required by a job the entity is trying to fill. The skill information associated with the user and the jobs database may be used to identify job listings that are relevant to the user. The identified job listings may be returned as a result of the job search.

At step 802, skills and skill level information associated with a user may be retrieved. As set forth above with reference to FIG. 4, skill information and associated contextual data may be identified and retrieved from various different sources that may reside locally at an organization, or may be distributed throughout the Internet. Several skills may be identified based on the retrieved information. As set forth above with reference to FIG. 5, skills that a user possesses may be identified and scored based on the information that was retrieved by a component of a user profile management system, such as an aggregator. The identified skills may be stored in a data store of the user profile management system in a data object or data table associated with the user's profile. In various implementations, the stored information may be retrieved by a system component, such as a job search engine, in response to a user issuing a request for a job search.

At step 804, job query parameters may be generated based on the retrieved skill and skill level information. In various implementations, the job query parameters are data values used to configure a query strategy for a query of the jobs database. The retrieved skill and skill level information may include a list of identified skills that the user possesses. Moreover, the retrieved information may include information that identifies the user's skill level for each skill. The identified skills and skill levels may be included in the query strategy to configure the query to identify job postings targeted at employees with similar skills and similar skill levels.

The query parameters may also include data values provided by a user. Thus, an employee searching for jobs may provide an input that may be used to configure the query of the jobs database. For example, the user may specify characteristics about an employer, such as a work culture, the ability to work remotely, and other qualities that the user requires from a job. In some implementations, the user is provided with a user interface through which the user may select and identify job parameters that may be used to configure the query of the jobs database. An example of an image of a user interface screen that enables a user to select and identify job parameters is discussed in greater detail below with reference to FIG. 25.

At step 806, the jobs database may be queried based on the query parameters. The query parameters may be compared with data objects included in the jobs database to identify relevant job listings. Any job listings that match the parameters identified at step 804 may be identified and returned as a result of the query. In various implementations, the results of the query may include job or job listings that partially match the query parameters. Thus, if a job listing only matches one or two query parameters, it may still be returned as part of the result of the query.

At step 808, the identified jobs may be organized based on the retrieved skills and skill level information. A system component, such as a job search engine, may assign ranks or weights to each job listing returned by the query to assign an order to the results of the query. Accordingly, job listings returned by the query may be organized based on how closely they match the query parameters. Job listings that match all query parameters may be ranked highest and identified as the most relevant to the user's job search. Job listings that match fewer query parameters may be ranked lower and identified as less relevant to the user's job search.

At step 810, the ordered list of jobs may be rendered and presented to a user at a user interface. A system component, such as a rendering engine, may generate and render a user interface component that presents the ordered list of jobs to the user. In some implementations, the user interface component is rendered and presented as part of a webpage that is accessible over the Internet. In some implementations, the user interface component is rendered and presented as part of a service provided by a service provider, such as Chatter®. In various implementations, each job listing presented in the ordered list may be rendered as an interactive object configured to receive an input from a user. In response to receiving the input, the interactive object may navigate to or provide a link to a data object that stores detailed information about the job listing. Examples of images of user interface screens that include a rendered list of jobs are discussed in greater detail below with reference to FIG. 26 and FIG. 27.

Figure 9:
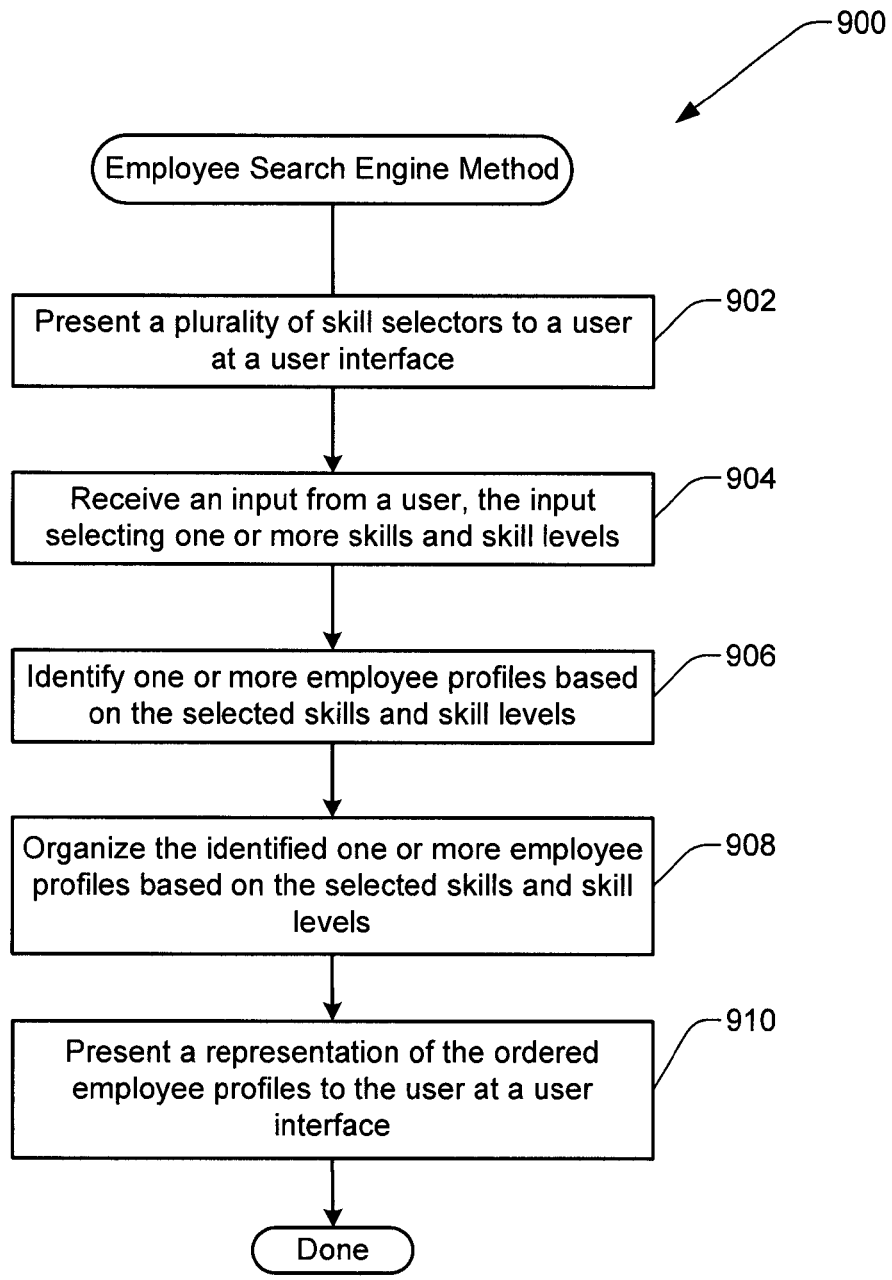
FIG. 9 illustrates a flowchart of an example of a method of identifying at least one employee based on skill information, performed in accordance with some implementations.

FIG. 9 illustrates a flowchart of an example of a method of identifying at least one employee based on skill information, performed in accordance with some implementations. Method 900 may query user profiles and identify at least one employee based on skill information associated with the employee. A user, such as a manager, may select various skills and skill levels that a potential employee should have. User profiles may be queried based on the selected skills and skill levels. If an employee's user profile sufficiently matches the selected skills and skill levels, the user profile may be identified and returned as a result of the query. The manager may be presented with an ordered presentation of the results.

At step 902, a plurality of skill selectors may be presented to a user. A user, such as a manager or a human resources worker, may be presented with a user interface by a system component, such as an employee search engine. The user interface may include several user interface components capable of receiving an input from a user that selects one or more skills that may be used to configure a query used to identify several employees. For example, the user interface may include drop down windows, free response text fields, and sliders that allow a user to select several skills and skill levels that an employee should possess. An example of an image of a user interface screen that may present skill selectors to a user is discussed in greater detail below with reference to FIG. 28.

At step 904, an input may be received from a user. The input may include a selection that identifies a plurality of skills. Thus, the user may interact with or modify at least one of the user interface components presented in the user interface. The input may identify several skills and skills levels for each skill. The identified skills and skill levels may be used as query parameters that configure a search strategy of employee profiles.

Accordingly, at step 906, a plurality of employee profiles may be identified based on the identified skill and skill levels. As previously discussed, employee profiles may be data objects or records associated with employees that are stored in a database system which may be a part of a user profile management system or an organizational profile management system. The employee profiles may include one or more data values that identify skills that the employees possess and skills levels associated with those skills. The employee profiles may be queried to determine which employee profiles include skills and skill levels that match the parameters identified at step 904. Employee profiles that include at least one matching skill may be identified and returned as a result of the query.

At step 908, the plurality of employee profiles may be organized based on the received input. A system component, such as the employee search engine, may assign a weight or rank to each of the employee profiles returned as a result of the query. Employee profiles that include all or most matching skills at the appropriate skill levels may be identified as highly relevant and ranked higher, while employee profiles that include few matching skills at insufficient skill levels may be identified as less relevant and ranked lower. The employee profiles may be arranged and stored in a data object as an ordered list of user profiles.

At step 910, the organized employee profiles may be presented to the user. A system component, such as the employee search engine, may include a rendering engine configured to render the ordered employee profiles as a user interface component that may be displayed to the user. The rendered user interface component may be displayed as part of a webpage accessible via a network, such as the Internet. The rendered user interface component may also be displayed as part of a service provide by a service provider, such as Chatter®. Employee profiles identified in the rendered user interface component may be rendered as interactive objects which allow a user to select an employee profile and navigate to a data object that includes more detailed information about the employee. An example of an image of a user interface screen that includes rendered user interface components is discussed in greater detail below with reference to FIG. 29.

Figure 10:
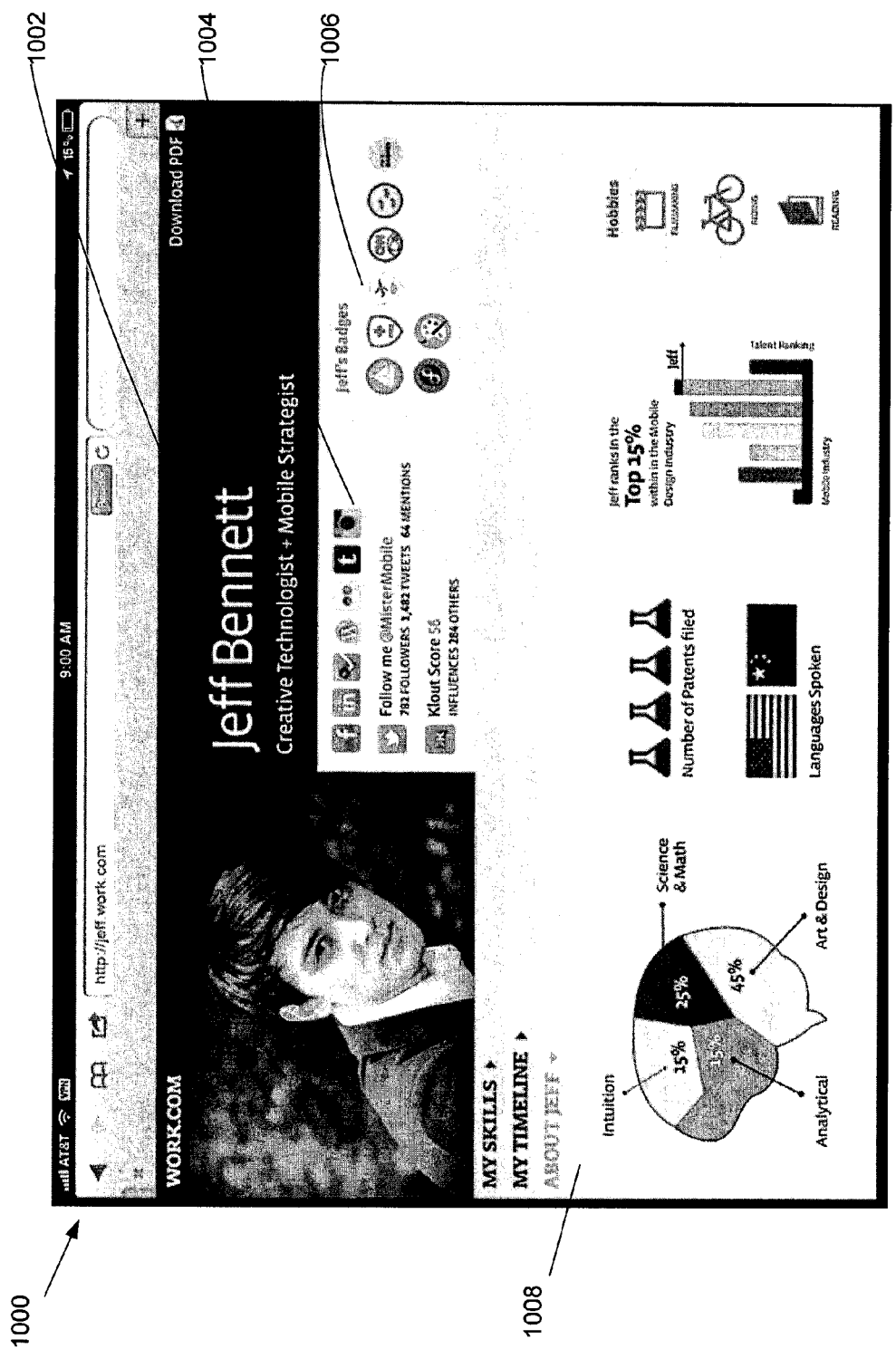
FIG. 10 illustrates an example of an image of a user interface screen that includes user interface components configured to display skill information retrieved from various different sources, in accordance with some implementations.

FIG. 10 illustrates an example of an image of a user interface screen that includes user interface components configured to display skill information retrieved from various different sources, in accordance with some implementations. Accordingly, image 1000 may display a user interface screen that presents an employee profile for an employee that may be a user of a user profile management system. Image 1000 may include data field 1002, which may include various biographical and contact information, as well as a profile picture. Image 1000 may also include data field 1004, which includes widgets or user interface components, such as interactive icons, that identify which social networks the employee belongs to. Data field 1004 may also provide various information about the employee's activities within the social networks, such as a number of posts the employee has made, a number of followers that the employee has, as well as an indicator of the employee's overall social influence. The information and icons presented in data field 1004 may be generated based on the information aggregated by the user profile management system.

In some implementations, image 1000 also includes data field 1006 which displays any badges that the employee may have earned during his current and previous employment. As similarly discussed before, an employer may use a badge system, such as Rypple®, to reward employees and recognize their achievements and performance-related accomplishments. Data field 1006 may be configured to display any badges that the employee has earned, and that were aggregated by the user profile management system.

Image 1000 may also include data field 1008, which may be an expandable window that includes various graphical representations of aggregated skill information associated with the employee. For example, data field 1008 may include a graphical representation of what types of skills that the employee possesses as well as how many patents the employee has filed. Data field 1008 may also include a graphical representation generated based on a ranking of the employee within his industry. Thus, skill information, such as skills that the employee possesses as well as skill levels associated with those skills, may be compared with other users in the industry and a ranking or percentile may be generated and displayed.

Figure 11:
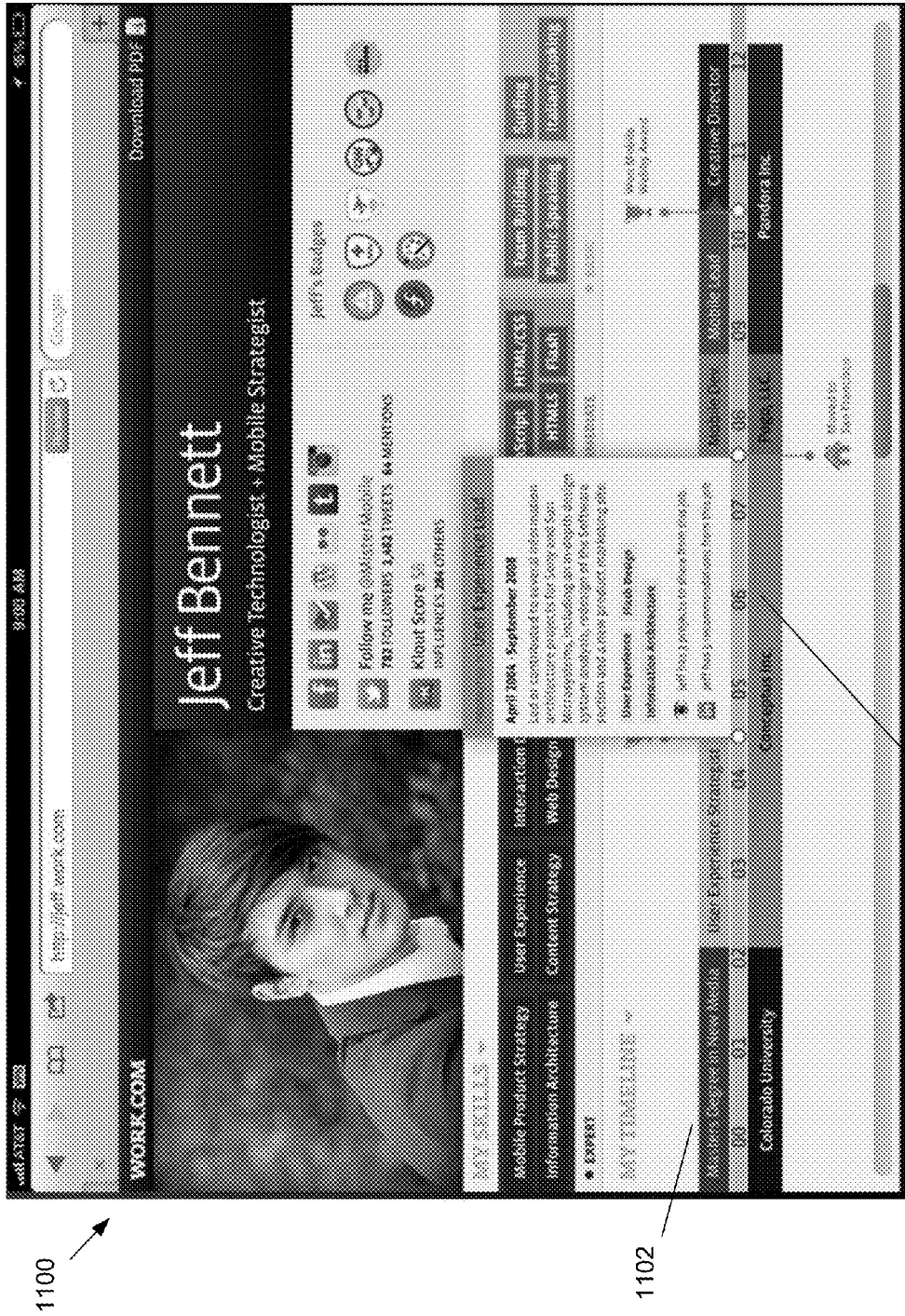
FIG. 11 illustrates another example of an image of a user interface screen that includes user interface components configured to display skill information retrieved from various different sources, in accordance with some implementations.

FIG. 11 illustrates another example of an image of a user interface screen that includes user interface components configured to display skill information retrieved from various different sources, in accordance with some implementations. Image 1100 may also display a user interface screen that presents an employee profile for an employee that may be a user of a user profile management system. Image 1100 may include data field 1102, which may include detailed information about skills and experience that the employee possesses. Accordingly, data field 1102 may be configured to present information aggregated by the user profile management system in a particular order, such as a chronological order that is presented as a timeline. Events within the timeline may be associated with data objects that were retrieved by an aggregator. For example, data field 1102 may include data field 1104 which provides a detailed view of aggregated skill information for a particular event, such as a period of employment. The aggregated information displayed in data field 1104 may identify specific work experience that the employee has, skills that have been identified based on information aggregated for this particular event, and recommendations and other activities associated with the event.

Figure 12:
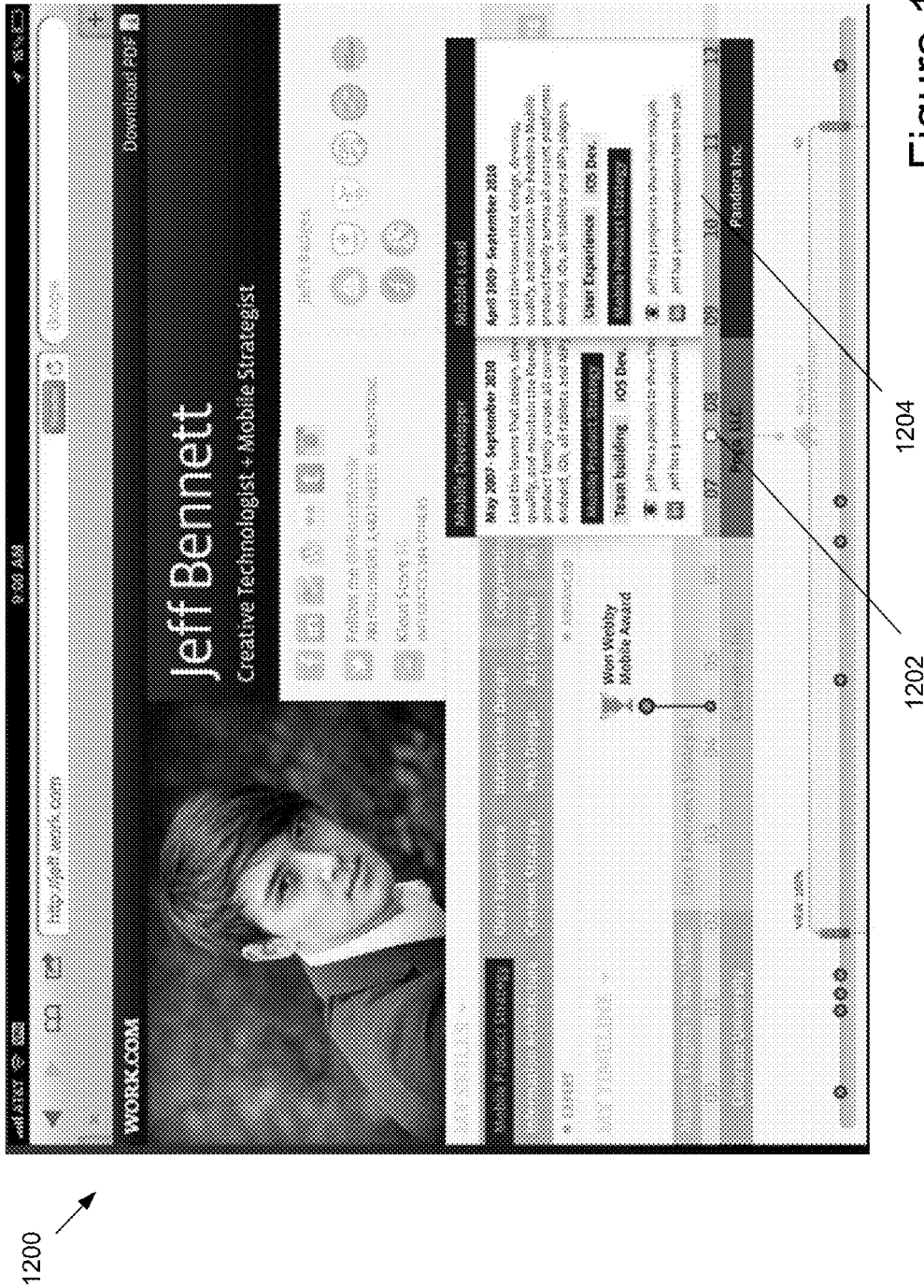
FIG. 12 illustrates yet another example of an image of a user interface screen that includes user interface components configured to display skill information retrieved from various different sources, in accordance with some implementations.

FIG. 12 illustrates yet another example of an image of a user interface screen that includes user interface components configured to display skill information retrieved from various different sources, in accordance with some implementations. Image 1200 may also display a user interface screen that presents an employee profile for an employee that may be a user of a user profile management system. Image 1200 may include data field 1202 and data field 1204, which may include detailed information about skills and experience that the employee possessed or gained at particular points in time or as a result of particular events. As image 1200 illustrates, aggregated skill information may be displayed for multiple events simultaneously. For example, data field 1202 displays skill information for a first period of employment while data field 1204 displays skill information for a second period of employment.

Figure 13:
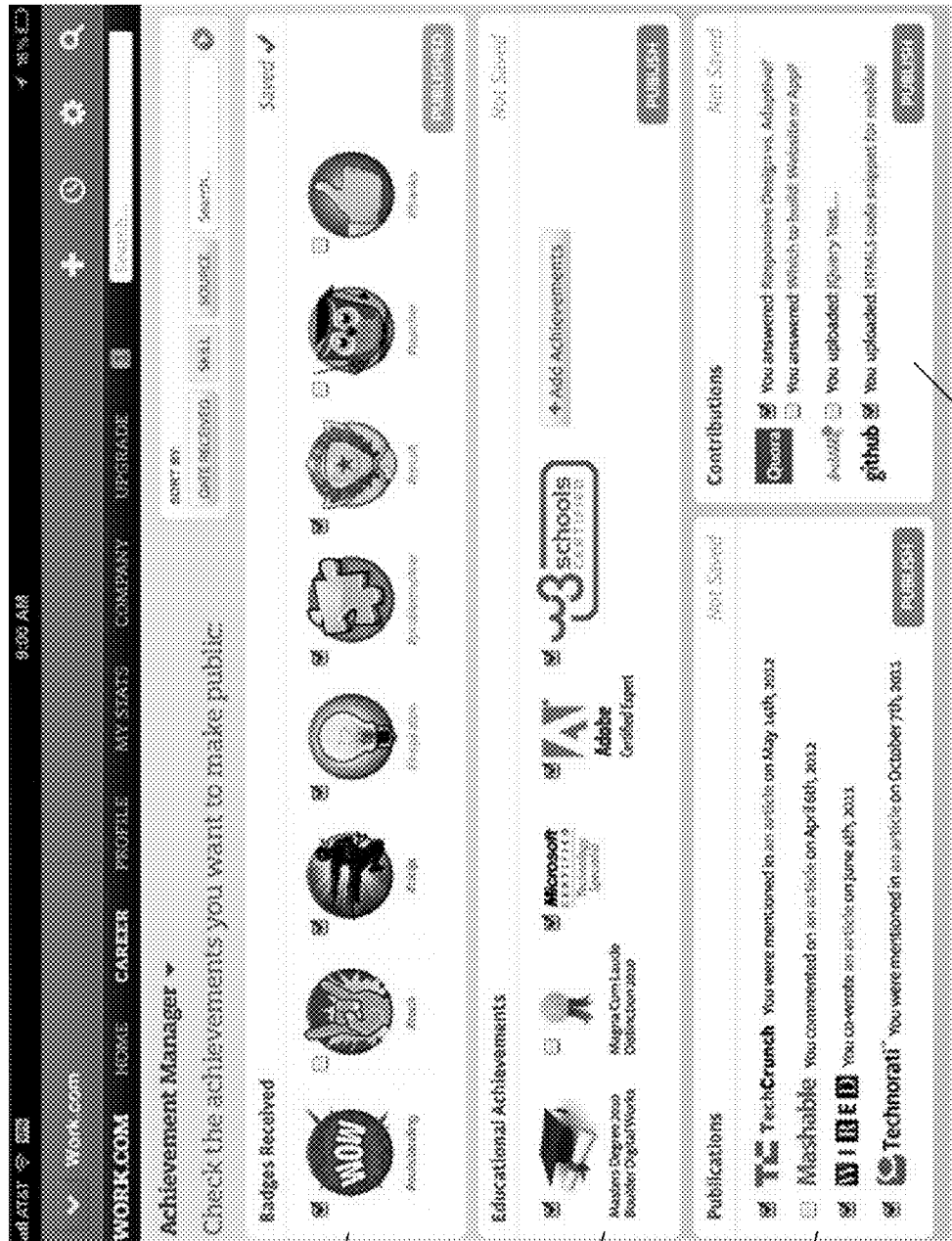
FIG. 13 illustrates an example of an image of a user interface screen that a user, such as an employee, may use to manage user interface components displayed in his or her user profile, in accordance with some implementations.

FIG. 13 illustrates an example of an image of a user interface screen that a user, such as an employee, may use to manage user interface components displayed in his or her user profile, in accordance with some implementations. Image 1300 may display various information aggregated by a user profile management system from various sources, such as social networks, internet sources, and other databases. Graphical representations or icons that represent data objects included in the aggregated information may be displayed in various data fields of image 1300. The data fields may be configured to display particular types of information or may be organized based on where data objects were retrieved from. For example, image 1300 may include data field 1302, which may display all badges that a user has earned during his or her professional career. Image 1300 may also include data field 1304 which may list all educational achievements that the user has achieved. The educational achievement information may have been retrieved from social network accounts such as LinkedIn® and Facebook®. Image 1300 may also include data field 1306 which may list all publications that the user has authored. Publication information may have been retrieved from various internet sources. Image 1300 may also include data field 1308 which may list various contributions that a user has made to online forums and websites, such as Quora® and Github®.

In various implementations, the user can modify a setting associated with each listed data object. The setting may determine whether or not the data object should be included in the user's profile. For example, the setting may be a check mark presented in a check box. If the user selects the checkbox, the data object associated with the checkbox may be included in the user's profile and used to identify and score skills associated with the user. If the user does not select or deselects the checkbox, the data object associated with the checkbox might not be included in the user's profile and might not be used to identify and score skills associated with the user.

Figure 14:
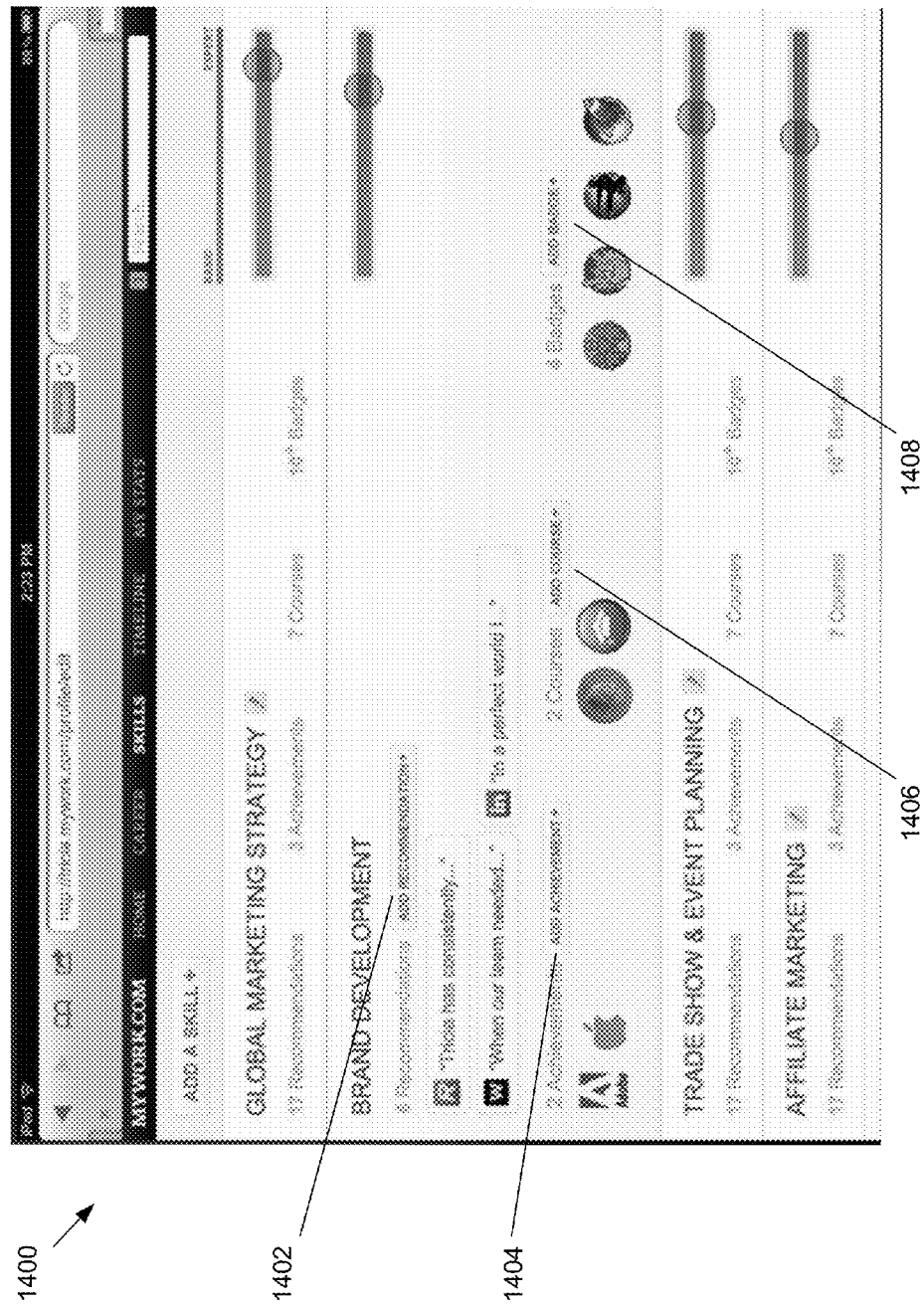
FIG. 14 illustrates another example of an image of a user interface screen that a user, such as an employee, may use to manage user interface components displayed in his or her user profile, in accordance with some implementations.

FIG. 14 illustrates another example of an image of a user interface screen that a user, such as an employee, may use to manage user interface components displayed in his or her user profile, in accordance with some implementations. Image 1400 may include various data fields which are configured to receive an input from a user that indicates that additional information or data objects should be retrieved and incorporated into the user's profile in the user profile management system. Thus, a user, such as an employee, may prompt the retrieval and aggregation of skill information. For example, image 1400 may include data field 1402 which may be configured receive an input from a user that indicates that additional recommendations should be retrieved from online social networks, such as LinkedIn®. In response to receiving an input, data field 1402 may be configured to send a message to a system component, such as an aggregator, that queries the online social networks and retrieves additional recommendations. Image 1400 may also include data field 1404 which may be configured receive an input from a user that indicates that additional achievements should be retrieved. Image 1400 may further include data field 1406 which may be configured receive an input from a user that indicates that additional educational information, such as degrees, courses, and academic awards, should be retrieved. Image 1400 may additionally include data field 1404 which may be configured receive an input from a user that indicates that additional badges should be retrieved.

Figure 15:
FIG. 15 illustrates yet another an example of an image of a user interface screen that a user, such as an employee, may use to manage privacy settings associated with user interface components displayed in his or her user profile, in accordance with some implementations.

FIG. 15 illustrates yet another an example of an image of a user interface screen that a user, such as an employee, may use to manage privacy settings associated with user interface components displayed in his or her user profile, in accordance with some implementations. Image 1500 may include data fields configured to provide more detailed views for skill information and may further display settings associated with the skill information. In various implementations, the settings can be modified to determine who may view the skill information. For example, for a particular badge, image 1500 may display data field 1502 which provides a user with detailed information about a selected badge. Moreover, image 1500 may include data field 1504 which displays a current privacy setting for the badge. For example, the privacy settings may be "Public," "Private," or "My Company," which may make the badge viewable only by other entities within the employee's company. Data field 1504 may also display various checkboxes which allow the employee to select which social networks the badge may be shared with or uploaded to.

Figure 16:
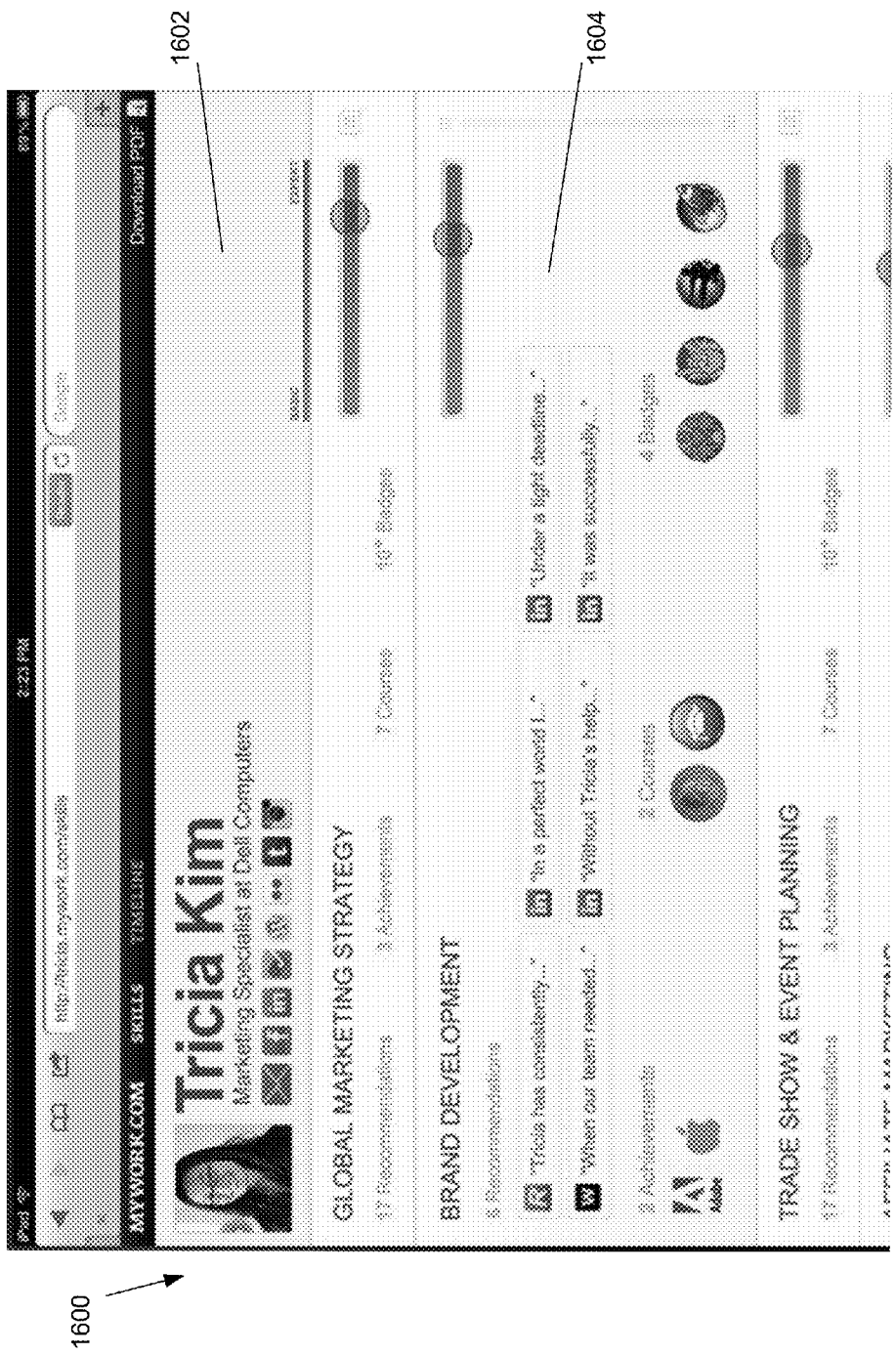
FIG. 16 illustrates an example of an image of a user interface screen in which user, such as an employee, has added additional information to his or her user profile, in accordance with some implementations.

FIG. 16 illustrates an example of an image of a user interface screen in which user, such as an employee, has added additional information to his or her user profile, in accordance with some implementations. Thus, image 1600 may include data field 1602 which includes additional contact information, profile information, and a profile picture that the user has added to his or her profile. Image 1600 may further include data field 1604 which has been modified to include additional recommendations that were identified and retrieved from various social networks in response to an input provided by the user.

Figure 17:
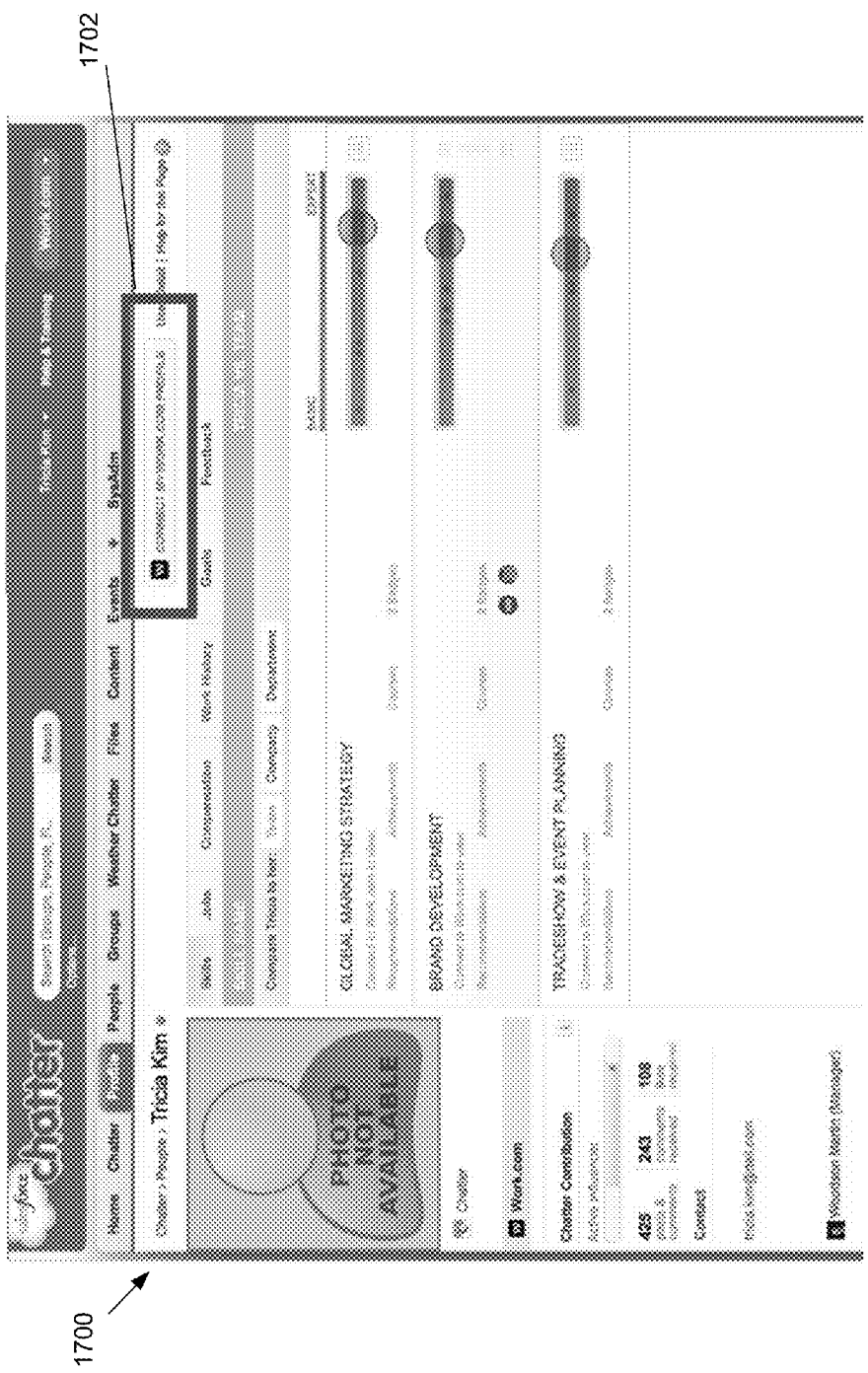
FIG. 17 illustrates an example of an image of a user interface screen of a social network that may be modified to incorporate skill information from a user profile management system, in accordance with some implementations.

FIG. 17 illustrates an example of an image of a user interface screen of a social network that may be modified to incorporate skill information from a user profile management system, in accordance with some implementations. Image 1700 may be a profile view of a user's social network profile in an online social network, such as Chatter®. Thus, image 1700 may include various profile information, such as a name, work experience, and email address, which may be stored and maintained by the provider of the social network. Image 1700 may include data field 1702 which may be configured to receive an input from the user. In response to receiving an input from the user, data field 1702 may be configured to send a message to a user profile management system. The message may be a request to retrieve aggregated skill information from a database system of the user profile management system.

Figure 18:
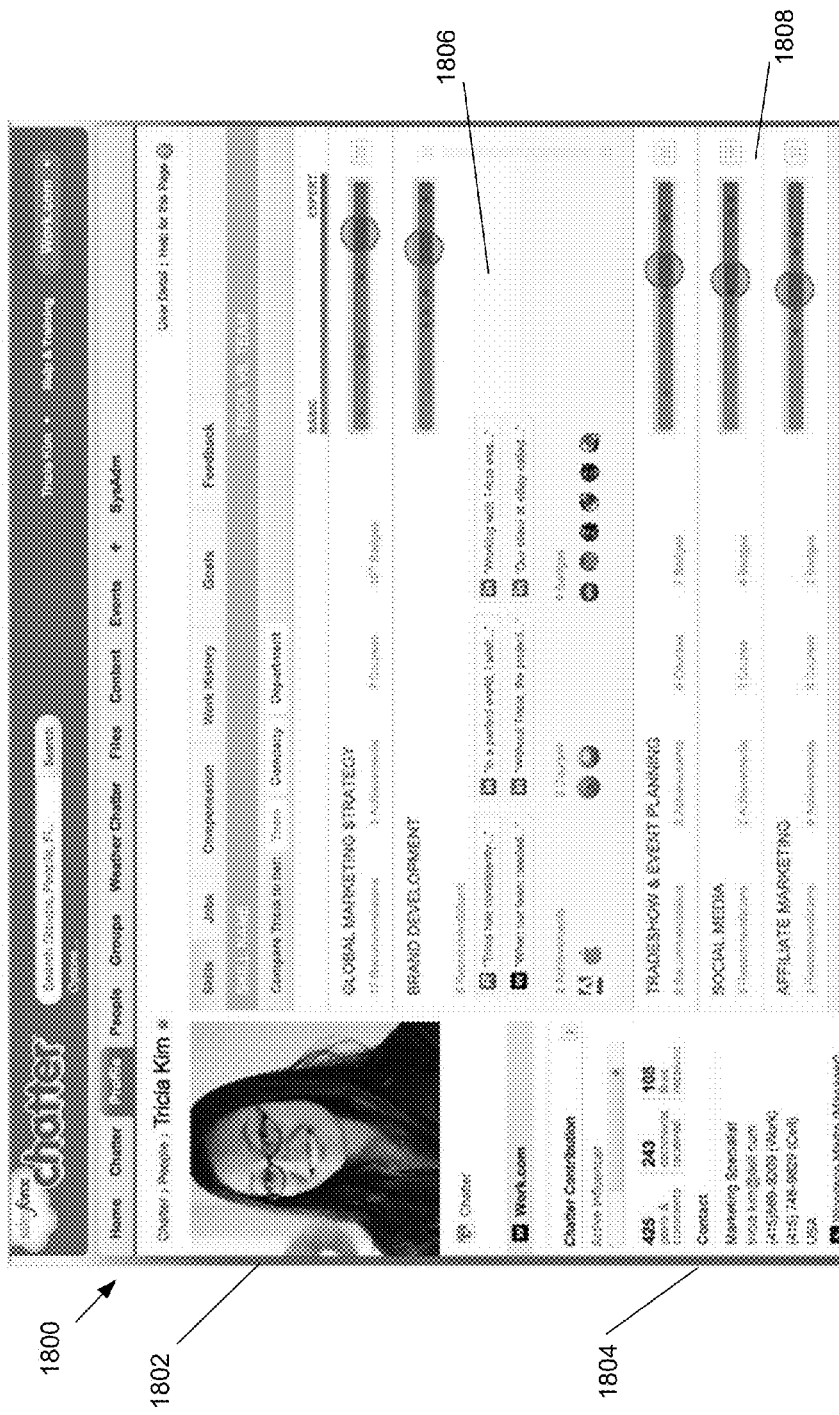
FIG. 18 illustrates another example of an image of a user interface screen of a social network that may be modified to incorporate skill information from a user profile management system, in accordance with some implementations.

FIG. 18 illustrates another example of an image of a user interface screen of a social network that may be modified to incorporate skill information from a user profile management system, in accordance with some implementations. Image 1800 may be a profile view of a user's social network profile in an online social network that has been modified or updated to include skill information that was retrieved from a user profile management system. For example, data field 1802 has been updated to include a profile picture that was retrieved from the user's profile in the user profile management system. Data field 1804 has been updated to include additional contact information specific to the user. Furthermore, image 1800 has been modified to include data field 1806 which displays various badges, accomplishments, recommendations, and achievements which were retrieved and aggregated by the user profile management system. Data field 1808 has been updated to include additional skills for the user and their corresponding skill levels as may have been previously calculated by one or more components of the user profile management system.

Figure 19:
FIG. 19 illustrates yet another example of an image of a user interface screen of a social network that may be modified to incorporate skill information from a user profile management system, in accordance with some implementations.

FIG. 19 illustrates yet another example of an image of a user interface screen of a social network that may be modified to incorporate skill information from a user profile management system, in accordance with some implementations. Icons or graphical representations of events and achievements presented in the user interface screen of the social network may be selected or moused over to provide a detailed view and additional skill information that was aggregated by and retrieved from a user profile management system. For example, image 1900 may include data field 1902 which may provide detailed information about a badge that was retrieved from an employee's profile in the user profile management system and is now visible in the employee's social network profile in the social network Chatter®.

Figure 20:
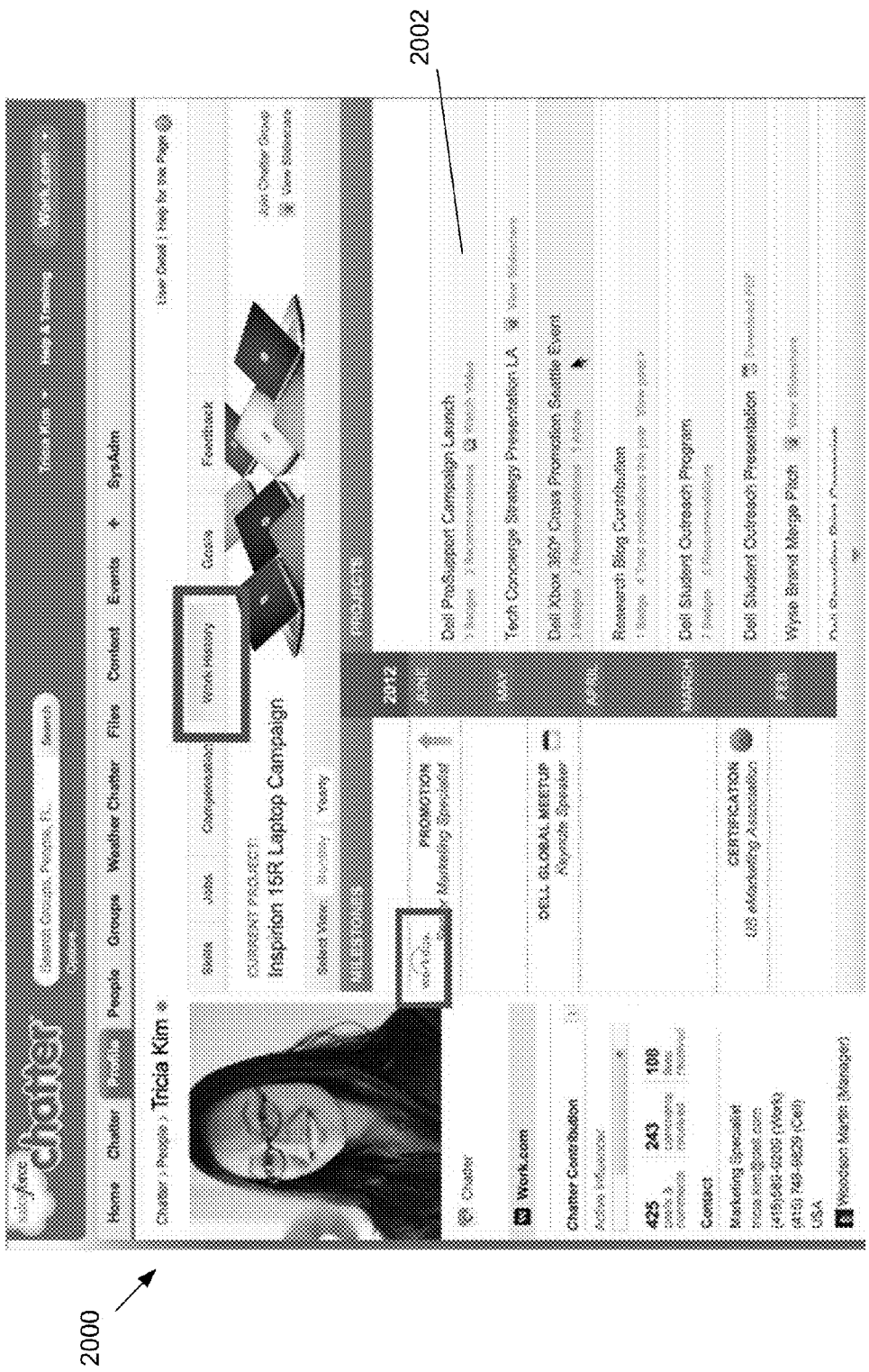
FIG. 20 illustrates an additional example of an image of a user interface screen of a social network that may be modified to incorporate skill information from a user profile management system, in accordance with some implementations.

FIG. 20 illustrates an additional example of an image of a user interface screen of a social network that may be modified to incorporate skill information from a user profile management system, in accordance with some implementations. Image 2000 includes data field 2002 which may be configured to display or present detailed information about skills and experience that the employee possesses. Data field 2002 may be configured to present information aggregated by user profile management system in a particular order, such as a chronological order that is presented as a timeline. Events within the timeline may be associated with data objects that were retrieved by an aggregator. Thus, data field 2002 may display various events, such as presentations and promotions, that were retrieved and aggregated by the user profile management system. Moreover, data field 2002 may render links to relevant data objects. For example, if a presentation that the user gave is displayed in the timeline, a link may be provided to a PDF file that includes the slide deck that was discussed at the presentation.

Figure 21:
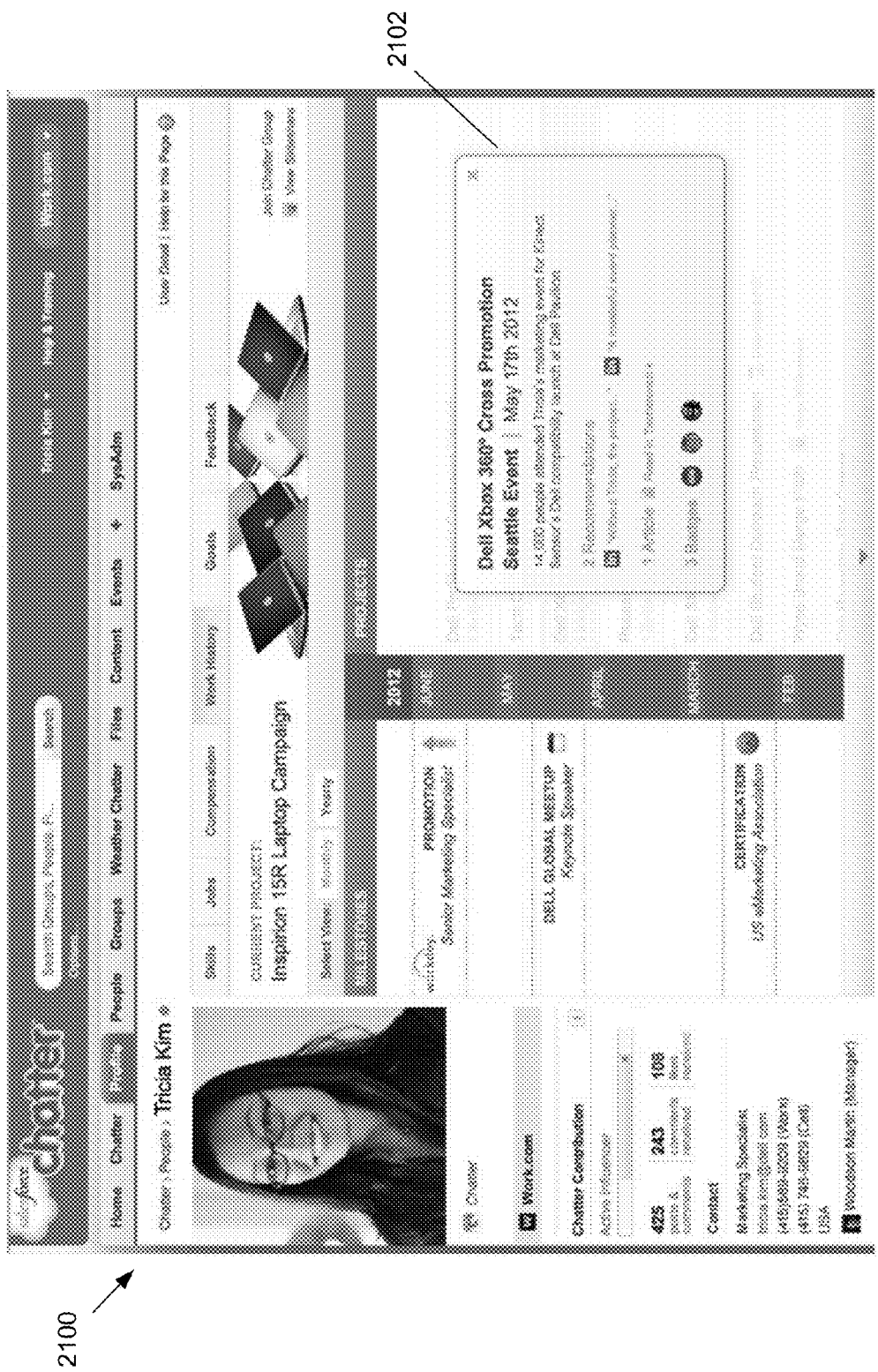
FIG. 21 illustrates an additional example of an image of a user interface screen of a social network that may be modified to incorporate skill information from a user profile management system, in accordance with some implementations.

FIG. 21 illustrates an additional example of an image of a user interface screen of a social network that may be modified to incorporate skill information from a user profile management system, in accordance with some implementations. As similarly discussed with reference to FIG. 20, skill information retrieved from a user profile management system may be retrieved and presented in a social network profile in a chronological order as a timeline. In various implementations, events and achievements presented in the timeline may be selected by a user via the user interface. In response to receiving a selection, an additional window or data field may be displayed that displays all available skill and profile information associated with the selected event or achievement. Thus, a selection of a data object may be used to identify and display other related skill information. For example, image 2100 may include data field 2102 which displays detailed information about a presentation in response a user selecting the presentation in the profile timeline. The detailed information may display information such as a number of people who attended the presentation, articles that relate to the presentation, and badges which may have been awarded as a result of the presentation.

Figure 22:
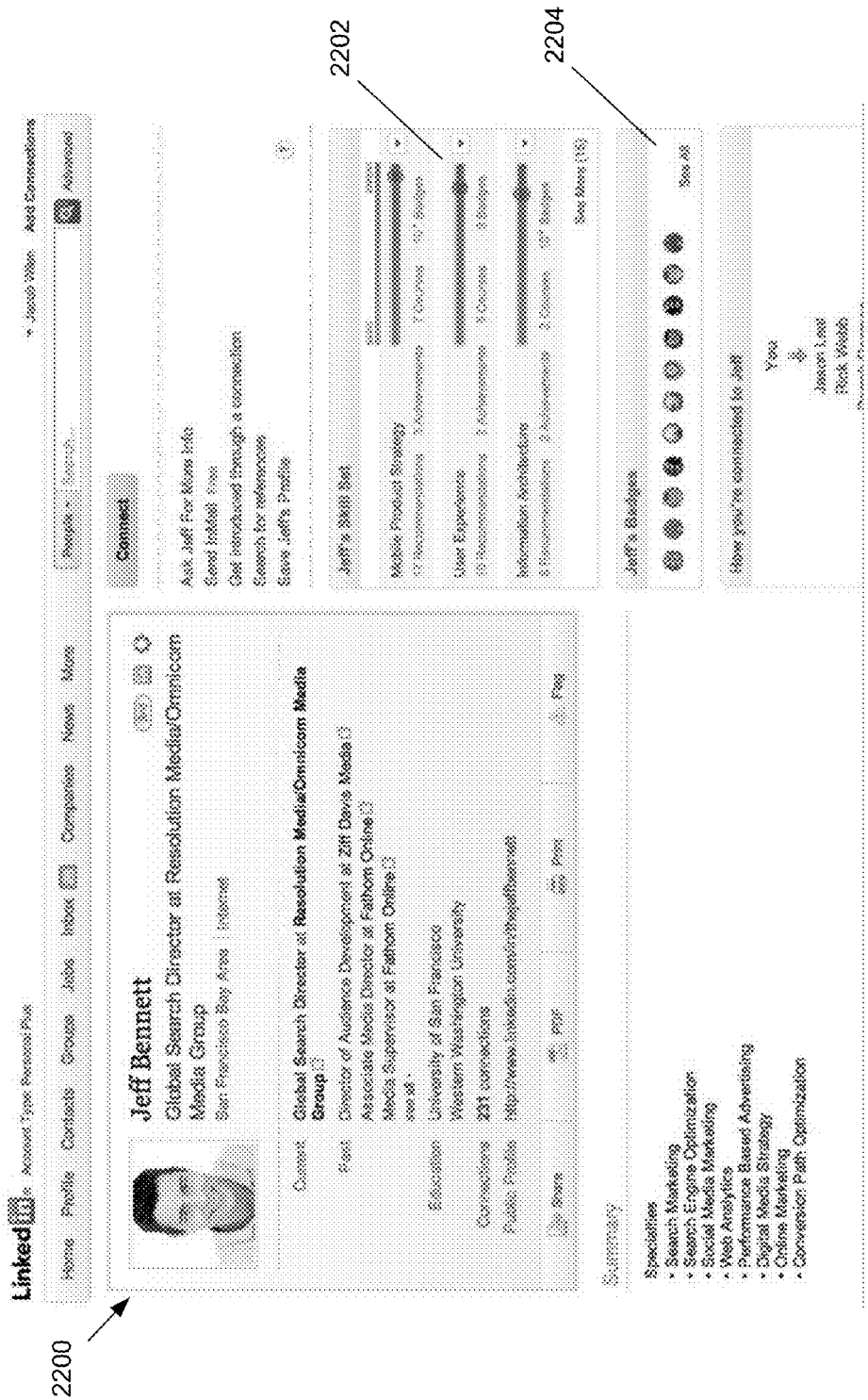
FIG. 22 illustrates an example of an online social network that has been modified to include skill information aggregated by and retrieved from a user profile management system, in accordance with some implementations.

FIG. 22 illustrates an example of an online social network that has been modified to include skill information aggregated by and retrieved from a user profile management system, in accordance with some implementations. Image 2200 may display a user's social network profile for a social network, such as LinkedIn®. In various implementations, the presentation of the social network profile is modified to include data fields or widgets that display information from a user profile management system. Thus, in addition displaying a user's social network profile information, image 2200 may also include data field 2202 which displays skill information identifying skills and scores associated with the user, and data field 2204 which displays badges that the user has earned. The skill information and badge information may have been retrieved from or provided by a user profile management system, as described previously with reference to FIG. 2.

Figure 23:
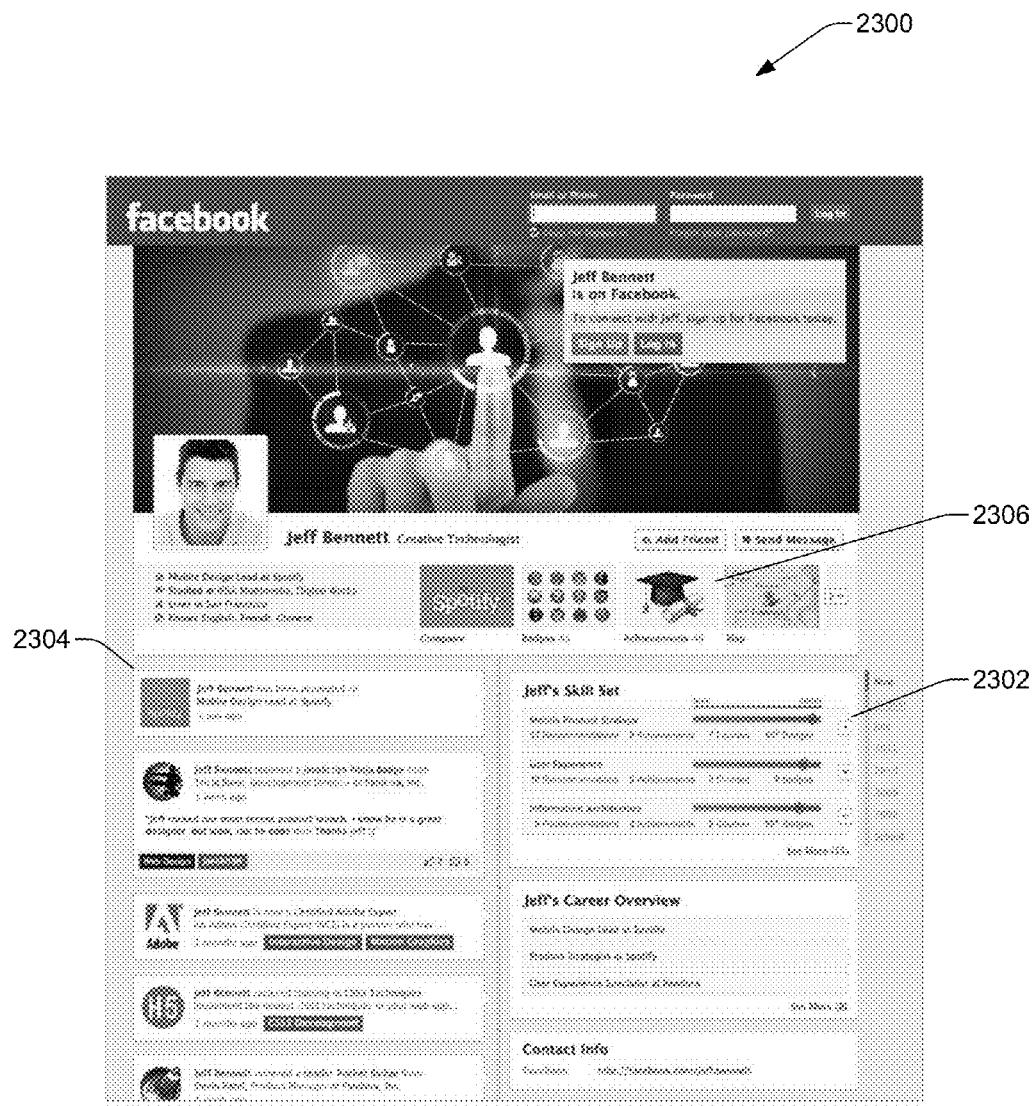
FIG. 23 illustrates another example of an online social network that has been modified to include skill information aggregated by and retrieved from a user profile management system, in accordance with some implementations.

FIG. 23 illustrates another example of an online social network that has been modified to include skill information aggregated by and retrieved from a user profile management system, in accordance with some implementations. Accordingly, a social network profile, such as a Facebook® profile, may be modified to display information managed by a user profile management system. For example, image 2300 may include data field 2302 which may display skill information identifying skills and scores associated with the user. Image 2300 may also include data field 2304 which may display various achievements and skill information in a timeline format that is native to the social network. Image 2300 may further include data field 2306 which may display badges and achievements organized based on a type of data object or information and presented in the social network's native format.

Figure 24:
FIG. 24 illustrates an example of an image of an organizational profile that includes user interface components configured to display skill information retrieved from various different sources for the organization's employees, in accordance with some implementations.

FIG. 24 illustrates an example of an image of an organizational profile that includes user interface components configured to display skill information retrieved from various different sources for the organization's employees, in accordance with some implementations. Accordingly, image 2400 may display an organizational profile for an organization that enables the organization to display and showcase skills that employees of the organization possess and achievements that employees of the organization have accomplished. In some implementations, image 2400 includes data field 2402, which may include various graphical representations of statistics and skill information generated based on skill information associated with the organization's employees. Thus, data field 2402 may be configured to display aggregate numbers generated or calculated based on an analysis of skill information and scores for each of the organization's employees. For example, data field 2402 may identify a total number of patents filed by employees of the organization. Data field 2402 may further identify aggregate numbers of skills and skill levels possessed by employees. Image 2400 may also include data field 2404 which may display aggregate social information indicative of the organization's work culture, such as music that employees listen. Such information may have been aggregated and retrieved by an organizational profile management system from the employee's social network profiles. Image 2400 may also include data field 2406 which may display job opportunities retrieved from a jobs database. In some implementations, image 2400 also includes data field 2408 which displays profiles of organizational leaders that may be identified based on having particular types of skills, such as leadership skills, greater than a threshold number of skills, and/or having greater than a threshold skill level for particular skills.

Figure 25:
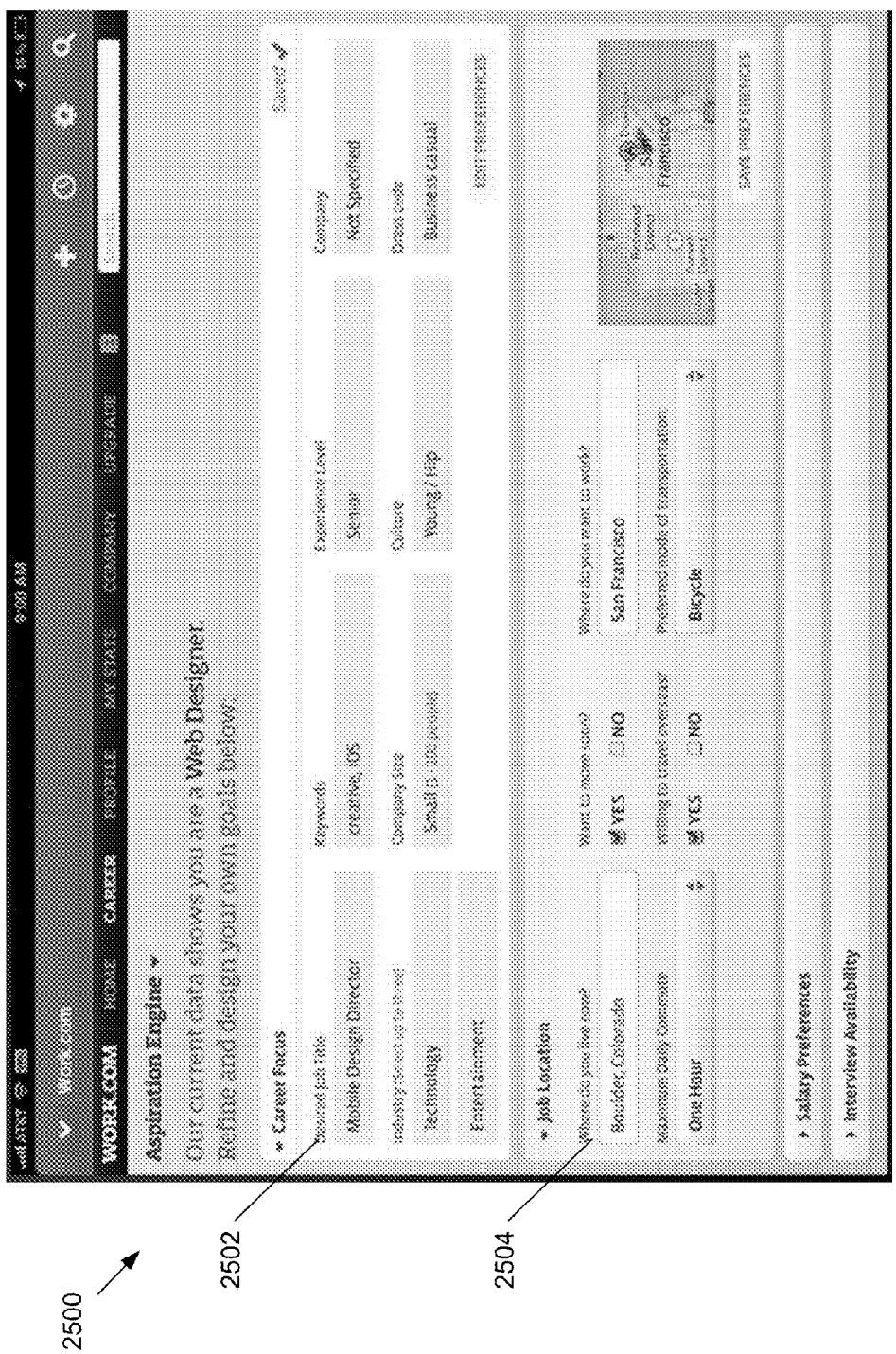
FIG. 25 illustrates an example of an image of a user interface screen that may be used by a user to select job parameters for a query of a jobs database, in accordance with some implementations.

FIG. 25 illustrates an example of an image of a user interface screen that may be used by a user to select job parameters for a query of a jobs database, in accordance with some implementations. Image 2500 may include various drop down boxes, free response text fields, and check boxes that may be configured to receive an input from a user. For example, image 2500 may include data field 2502 which may include several text fields in which a user may enter various information about a job that the user may be looking for, such as a desired job title, level of expertise, work culture, company size, and dress code. Image 2500 may also include data field 2504 which may include text fields, drop down boxes, and checkboxes for other attributes which may be more general or specific to the user's current location, such as a job location and a commute time.

In various implementations, the information entered into the data fields of image 2500 may be saved as part of the user's profile that may be viewable by other entities, such as other users of the user profile management system. Thus, a potential employer may view information entered and saved by an employee, such as the employee's desired job title, industry area, and work culture. The potential employer may use the information to determine whether or not he or she wishes to contact the employee to hire the employee for a job.

Figure 26:
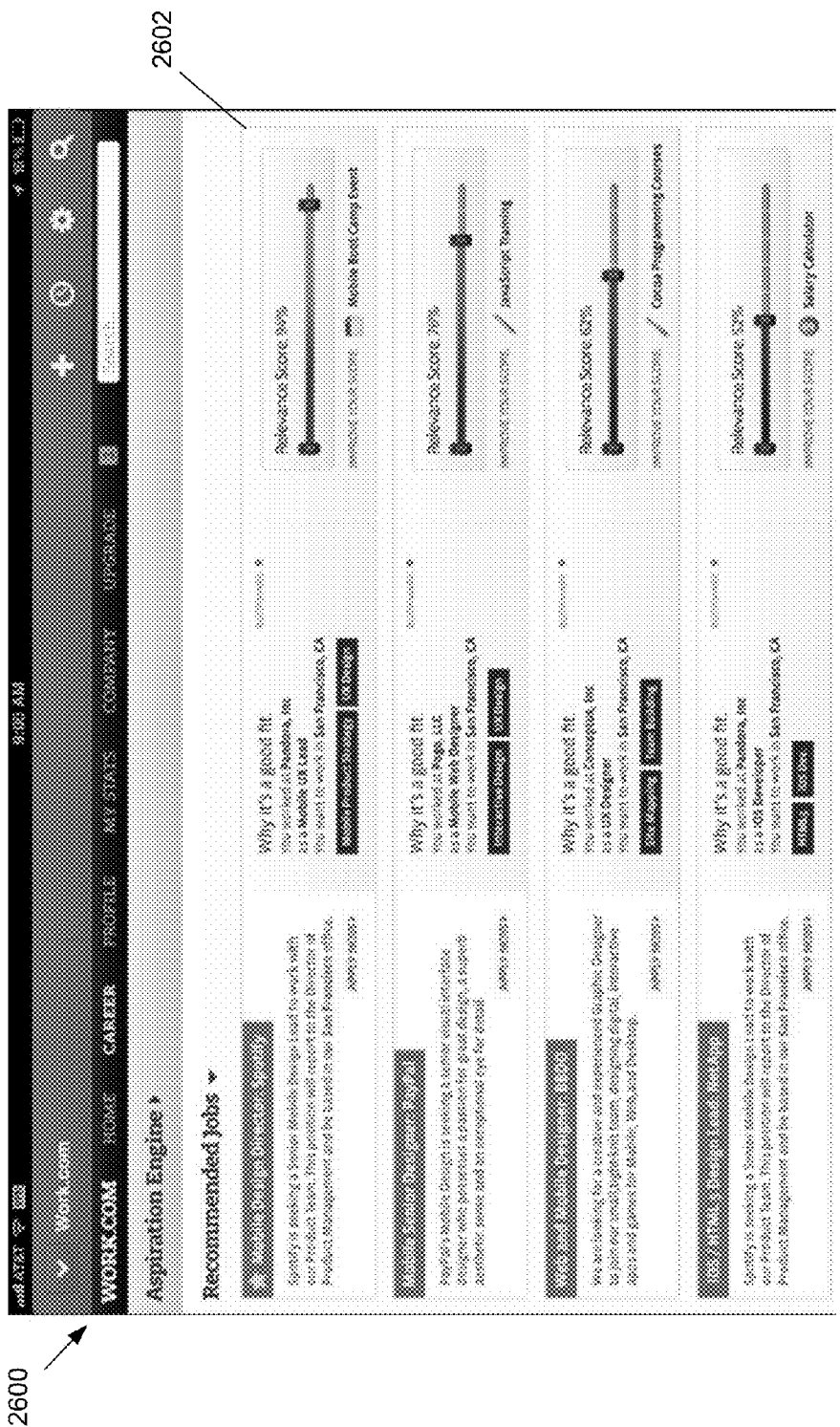
FIG. 26 illustrates an example of an image of a rendered list of jobs that may be presented to a user, in accordance with some implementations.

FIG. 26 illustrates an example of an image of a rendered list of jobs that may be presented to a user, in accordance with some implementations. Image 2600 may include rendered representations of the results of a job query. The results may be ordered based on a relevance that is determined based on skill information and scores associated with the employee and the job listing. The relevance of the job listing may be indicated by a relevance score which may be determined based on how closely the job query parameters match the parameters of the job listing. In addition to displaying a relevance score, the information underlying the relevance score may be displayed as well. For example, image 2600 may include data field 2602 which includes a job listing that is identified as highly relevant and having a relevance score of 94%. Data field 2602 also displays information underlying the relevance score, such as information indicating that the job listing is highly relevant or a good fit for the user because it is at a similar company as the user's current position, is in the same location, and seeks similar skills that the user has.

Figure 27:
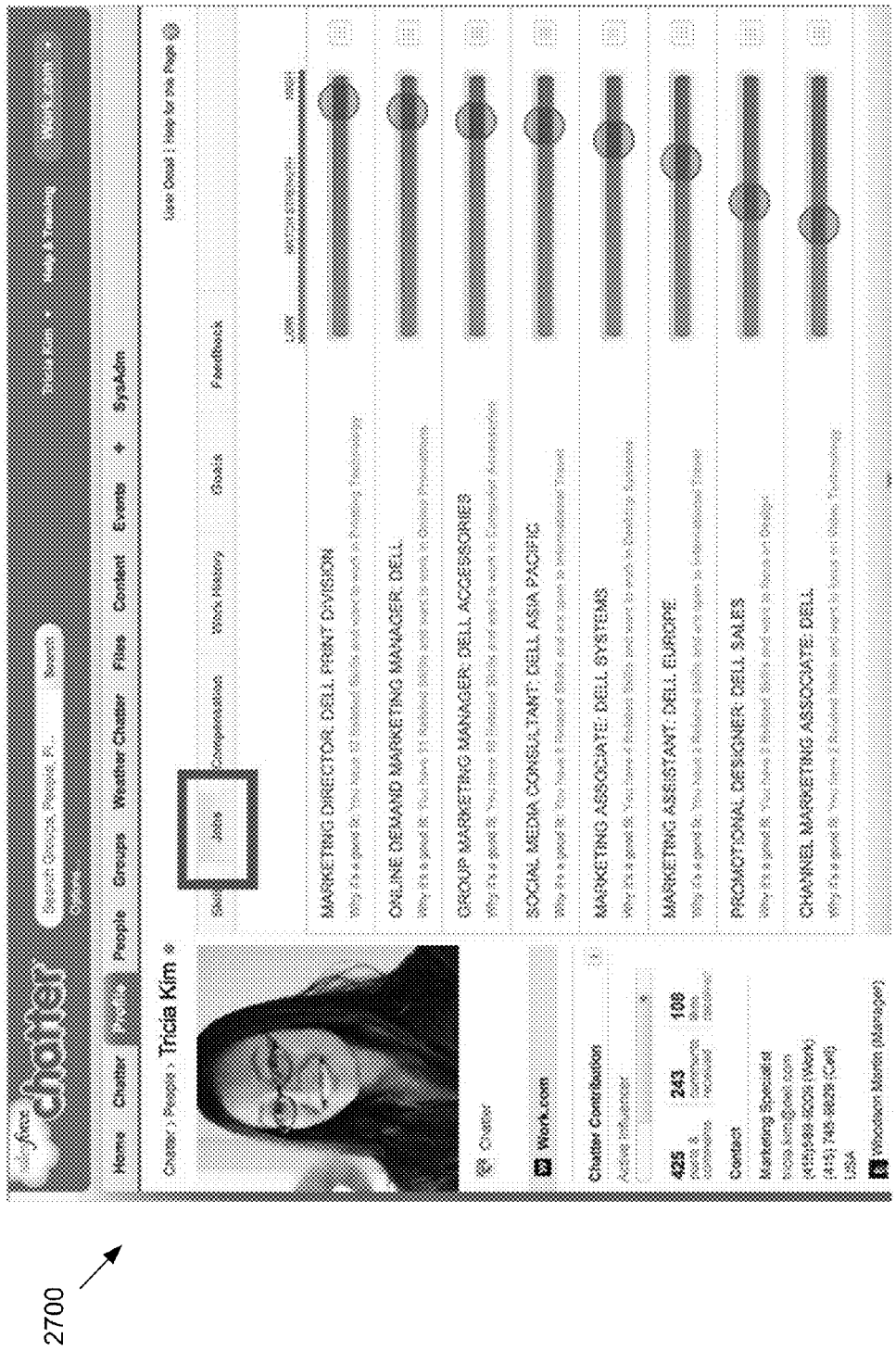
FIG. 27 illustrates another example of an image of a rendered list of jobs that may be presented to a user, in accordance with some implementations.

FIG. 27 illustrates another example of an image of a rendered list of jobs that may be presented to a user, in accordance with some implementations. Image 2700 is rendered and presented as part of a user interface screen of a social network, such as Chatter®. Thus, as similarly discussed with reference to FIG. 26, job listings and relevance scores, as well as related skill information and skill scores may be rendered and displayed. In this instance, the presentation of the rendered list of job listings generated by a user profile management system may be integrated with a user interface provided by a social network, such as Chatter®.

Figure 28:
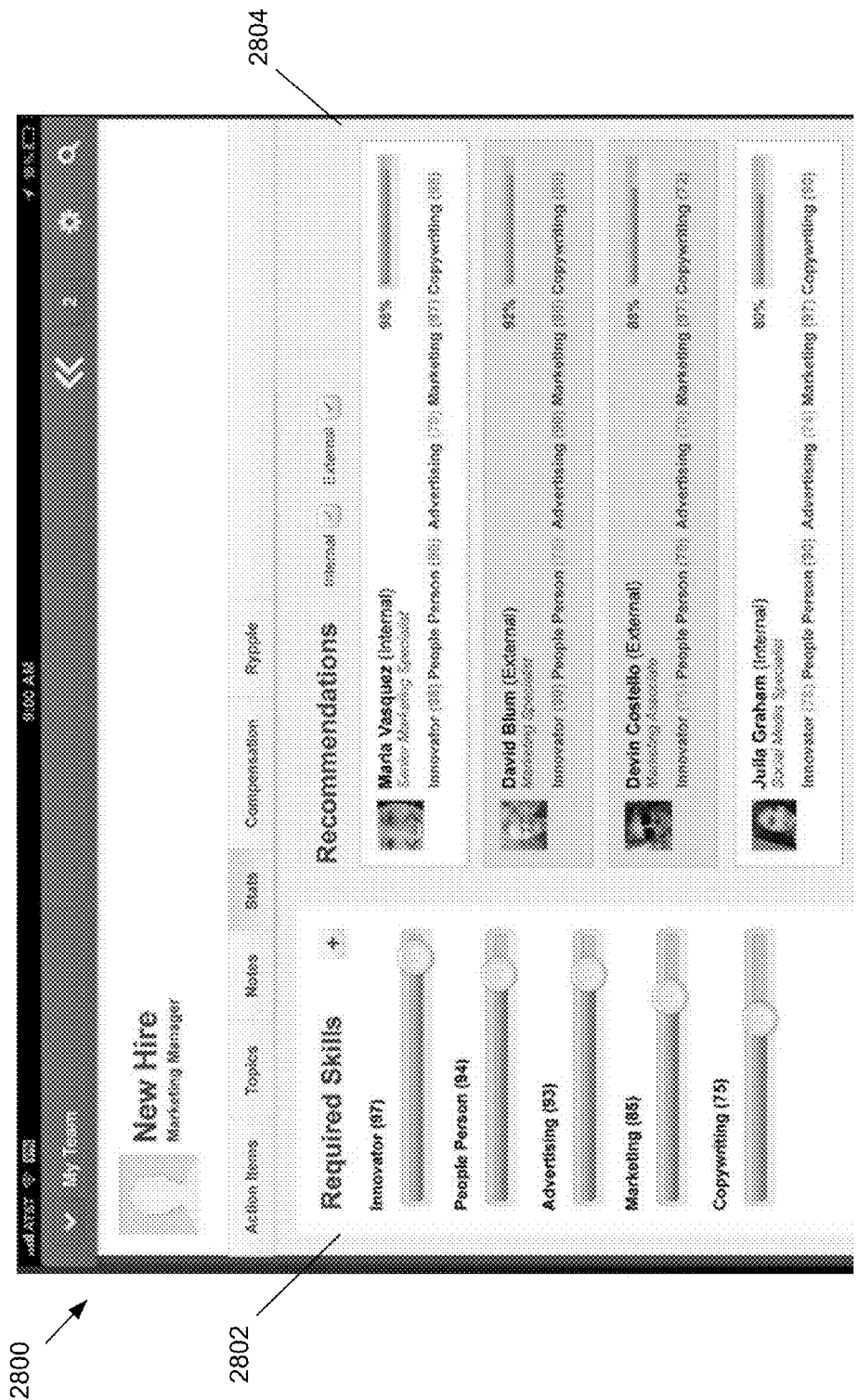
FIG. 28 illustrates an example of an image of a user interface screen which may enable a user to select several skills used to configure a search for potential employees, in accordance with some implementations.

FIG. 28 illustrates an example of an image of a user interface screen which may enable a user to select several skills used to configure a search for potential employees, in accordance with some implementations. Image 2800 may present a user, who may be a manager or director at a company, to configure a search for potential employees by selecting what skills and skill levels the potential hire must have. Furthermore, image 2800 may present the user with the results of a query that is configured based on the selected skills. For example, image 2800 may include data field 2802 which may include several user interface components configured to receive an input from a user that identifies one or more skills and skill levels. In this instance, the user is a manager looking for a new hire to add to her team. The manager has selected skills such as "innovator," "people person," "advertising," "marketing," and "copywriting." The manager has also selected skill levels for each skill by using various sliders presented in data field 2802.

Image 2800 may also include data field 2804 which displays a result of a query run based on the skills and skill levels that were selected using data field 2802. The results of the query may be identified by querying user profiles stored and maintained by a user profile management system and determining which user profiles match the selected skills and skill levels. The results may be rendered and presented in a list that is ordered based on a relevance or fit with the selected skills and skill levels. Moreover, the results may be rendered as interactive objects that, when selected, provide more detailed information about an employee or provide navigation to the employee's profile hosted by the user profile management system.

Figure 29:
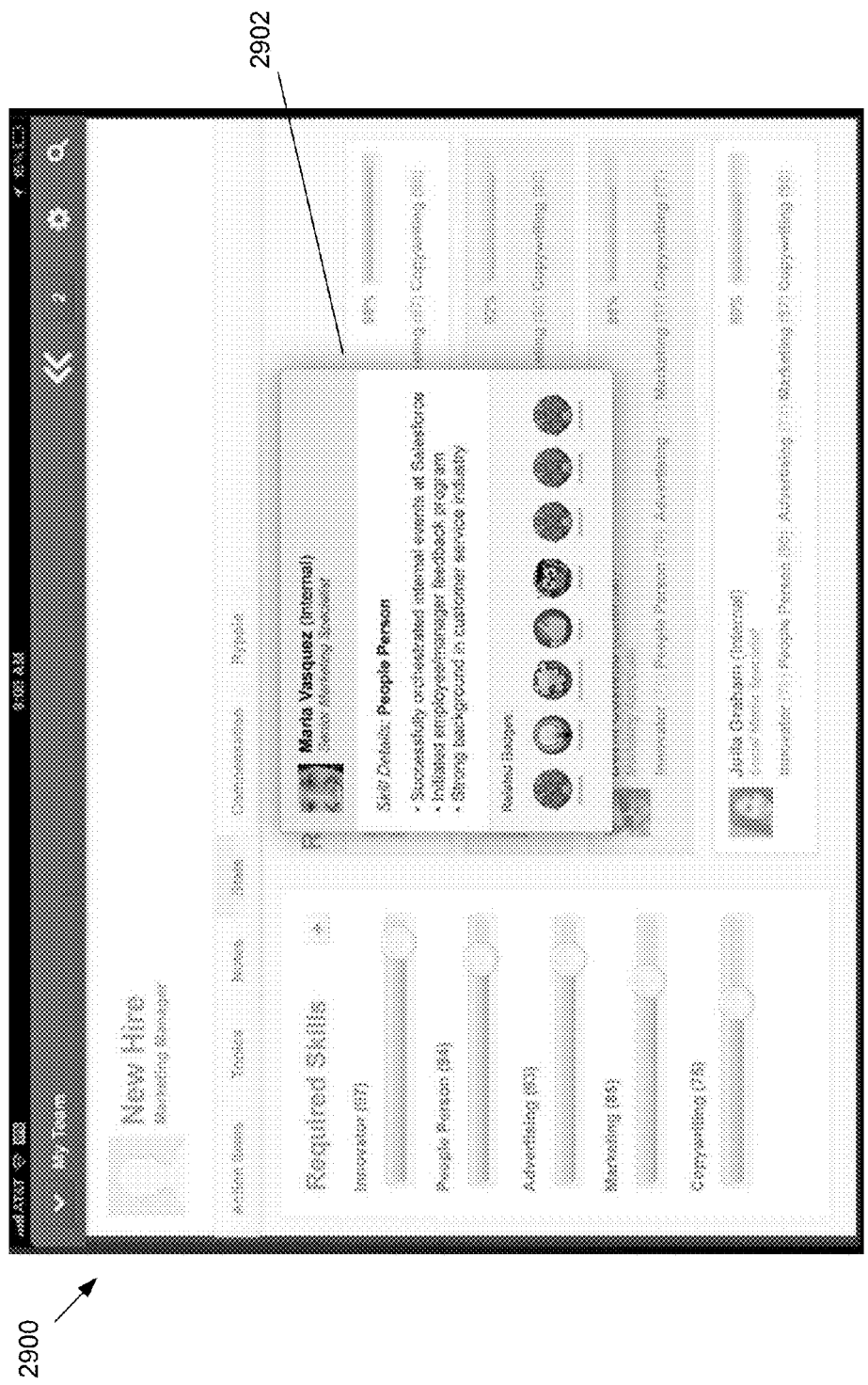
FIG. 29 illustrates an example of an image of a more detailed view of a rendered list of employees that may be presented to a user, in accordance with some implementations.

FIG. 29 illustrates an example of an image of a more detailed view of a rendered list of employees that may be presented to a user, in accordance with some implementations. As discussed above with reference to FIG. 28, a list of employees may be identified, rendered, and displayed in response to a user issuing a search or query for potential candidates for a new position. In various implementations, in response to receiving an input from a user that selects one of the employees presented in the result of the query, a more detailed view of the employee's profile may be provided. Accordingly, image 2900 may include data field 2902 which may display detailed skill information, a summary, and badges earned by the selected employee that was returned as a result of the query.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for generating and displaying user profiles, the method comprising:
receiving skill information associated with a user, the skill information including one or more data values that identify at least one skill associated with the user, and that further identify a skill level associated with the at least one skill;
retrieving social network information from at least one external social network, the social network information including profile information and social interaction information associated with the user;

combining the received skill information with the retrieved social network information;

generating a user profile based on the combined information;

sending the user profile to the at least one external social network; and displaying at least a portion of the user profile via a publicly accessible web page associated with the at least one external social network, the displayed portion of the user profile being selected based on configuration information, and wherein the portion of the user profile includes a graphical representation of at least some of the received skill information.

2. The method of claim 1 further comprising:
rendering the graphical representation as a user interface component of the at least one external social network, wherein the user interface component is an application or module of code that provides one or more graphical display functionalities for the at least one external social network.

3. The method of claim 2, wherein the user interface component is selected from the group consisting of: a widget, an icon, a data field, a window, and a badge.

4. The method of claim 1, wherein the configuration information identifies a first portion of the combined information that is included in the at least a portion of the user profile that is displayed via the publicly accessible web page associated with the at least one external social network, and wherein the configuration information further identifies a second portion of the combined information that is not displayed via the publicly accessible web page associated with the at least one external social network.

5. The method of claim 1, wherein the configuration information is received from a user via an input received at a social network user interface.

6. The method of claim 5, wherein the input modifies one or more privacy settings associated with the skill information.

7. The method of claim 1, wherein the publicly accessible web page associated with the at least one external social network is displayed in a user interface of an external online social network.

8. The method of claim 1, wherein the displayed portion of the user profile is rendered and displayed in a format of the at least one external social network.

9. The method of claim 1, wherein the association between the user and the skill information is determined based on the user authoring at least some of the skill information or being mentioned in at least some of the skill information.

10. The method of claim 1, wherein the at least one skill is defined by one or more data values identifying a professional ability or competency that the user possesses.

11. The method of claim 1, wherein the at least one skill is selected from the group of skills consisting of: coding, team building, public speaking, JavaScript, content strategy, web design, sales, marketing, innovating, and advertising.

12. A non-transitory machine-readable medium carrying one or more sequences of instructions which, when executed by one or more processors, cause the one or more processors to carry out the steps of:

receiving skill information associated with a user, the skill information including one or more data values that identify at least one skill associated with the user, and that further identify a skill level associated with the at least one skill;

retrieving social network information from at least one external social network, the social network information including profile information and social interaction information associated with the user;

combining the received skill information with the retrieved social network information;

generating a user profile based on the combined information;

sending the user profile to the at least one external social network; and displaying at least a portion of the user profile via a publicly accessible web page associated with the at least one external social network, the displayed portion of the user profile being selected based on configuration information, and wherein the portion of the user profile includes a graphical representation of at least some of the received skill information.

13. The machine-readable medium of claim 12, wherein the steps further comprise:
rendering the graphical representation as a user interface component of the at least one external social network, wherein the user interface component is an application or module of code that provides one or more graphical display functionalities for the at least one external social network.

14. The machine-readable medium of claim 12, wherein the configuration information identifies a first portion of the combined information that is included in the at least a portion of the user profile that is displayed via the publicly accessible web page associated with the at least one external social network, and wherein the configuration information further identifies a second portion of the combined information that is not displayed via the publicly accessible web page associated with the at least one external social network.

15. The machine-readable medium of claim 12, wherein the configuration information is received from a user via an input received at a social network user interface.

16. The machine-readable medium of claim 12, wherein the association between the user and the skill information is determined based on the user authoring at least some of the skill information or being mentioned in at least some of the skill information.

17. A system for generating and displaying user profiles, the system comprising:
a processor; and
one or more stored sequences of instructions which, when executed by the processor, cause the processor to carry out the steps of:

receiving skill information associated with a user, the skill information including one or more data values that identify at least one skill associated with the user, and that further identify a skill level associated with the at least one skill;

retrieving social network information from at least one external social network, the social network information including profile information and social interaction information associated with the user;

combining the received skill information with the retrieved social network information;

generating a user profile based on the combined information;

sending the user profile to the at least one external social network; and displaying at least a portion of the user profile via a publicly accessible web page associated with the at least one external social network, the displayed portion of the user profile being selected based on configuration information, and wherein the portion of the user profile includes a graphical representation of at least some of the received skill information.

18. The system of claim 17, wherein the steps further comprise:
rendering the graphical representation as a user interface component of the at least one external social network, wherein the user interface component is an application or module of code that provides one or more graphical display functionalities for the at least one external social network.

19. The system of claim 17, wherein the configuration information identifies a first portion of the combined information that is included in the at least a portion of the user profile that is displayed via the publicly accessible web page associated with the at least one external social network, and wherein the configuration information further identifies a second portion of the combined information that is not displayed via the publicly accessible web page associated with the at least one external social network.

20. The system of claim 17, wherein the association between the user and the skill information is determined based on the user authoring at least some of the skill information or being mentioned in at least some of the skill information.

* * * * *